United States Patent
Sukigara et al.

(10) Patent No.: US 7,820,276 B2
(45) Date of Patent: Oct. 26, 2010

(54) MATTE FILM OR SHEET

(75) Inventors: Masayuki Sukigara, Tokyo (JP);
Mitsuyoshi Itada, Tokyo (JP);
Michihiro Yatsuzuka, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 329 days.

(21) Appl. No.: 11/793,759

(22) PCT Filed: Jan. 6, 2006

(86) PCT No.: PCT/JP2006/000070

§ 371 (c)(1),
(2), (4) Date: Jun. 21, 2007

(87) PCT Pub. No.: WO2006/075553

PCT Pub. Date: Jul. 20, 2006

(65) Prior Publication Data

US 2008/0044650 A1 Feb. 21, 2008

(30) Foreign Application Priority Data

Jan. 11, 2005 (JP) ............................. 2005-004160
Mar. 11, 2005 (JP) ............................. 2005-069286

(51) Int. Cl.
*B32B 27/00* (2006.01)
(52) U.S. Cl. ...................... 428/212; 428/220; 428/34.2; 428/98; 428/338; 428/411.1; 428/524
(58) Field of Classification Search ................. 428/212, 428/220, 34.2, 98, 338, 411.1, 524
See application file for complete search history.

(56) References Cited

U.S. PATENT DOCUMENTS

| 2003/0166748 A1* | 9/2003 | Khemani et al. ............... 524/47 |
| 2003/0216496 A1* | 11/2003 | Mohanty et al. ............ 524/284 |
| 2006/0257676 A1* | 11/2006 | Itada et al. ................... 428/480 |

FOREIGN PATENT DOCUMENTS

| JP | 3138196 B2 | 12/2000 |
| JP | 2001-49003 A | 2/2001 |
| JP | 3172559 B2 | 3/2001 |
| JP | 3175306 B2 | 4/2001 |
| JP | 2002-200724 A | 7/2002 |
| JP | 2004-057016 A | 2/2004 |
| JP | 2004-066513 A | 3/2004 |
| JP | 2004-099671 A | 4/2004 |
| JP | 2004-131726 A | 4/2004 |
| JP | 2004-147613 A | 5/2004 |
| JP | 2004-315659 A | 11/2004 |
| WO | WO 03037966 A1 * | 5/2003 |

OTHER PUBLICATIONS

Machine Translation of JP-2004-131726 (Hachitsuka).*
Machine Translation of JP-2004-147613 (Kiyuuda).*

* cited by examiner

*Primary Examiner*—David R Sample
*Assistant Examiner*—Lawrence D Ferguson
(74) *Attorney, Agent, or Firm*—Birch, Stewart, Kolasch & Birch, LLP

(57) ABSTRACT

A single-layer matte film or sheet which comprises a filler and a biodegradable resin (A) comprising a blend of a biodegradable polyester ($a1$) having a glass transition temperature Tg of 10° C. or lower and a biodegradable polyester ($a2$) having a glass transition temperature Tg of 30° C. or higher, and in which at least one side thereof has a surface gloss (45-degree gloss) as measured in accordance with ASTM-D2457-70 of 60% or lower.

21 Claims, No Drawings

MATTE FILM OR SHEET

TECHNICAL FIELD

The present invention relates to a biodegradable resin film or sheet which has good film forming stability and processing aptitude, and excellent antifouling characteristic and matting property. Furthermore, the present invention relates to a matte (matte type) heat shrinkable or heat non-shrinkable film or sheet having antifouling characteristic, and a packaging material, an agricultural material for a growing house and a mulch film or the like, a wallpaper which suppresses gloss to exhibit settled appearance having high grade, a screen, an indoor decoration, an article for everyday, an envelope, a file case, school supplies such as a cover processed product, a writing material, a notebook, a paper product (containing a paper container, sliding-screen paper and a sliding screen), a cloth product, a fiber product, a tablecloth, a light diffusing plate for diffusing light or the like, which are obtained by laminating the film or sheet on the other materials.

BACKGROUND ART

Generally, transparent and glossy drawn films using various resin materials such as polyethylene terephthalate, polypropylene and polyethylene have been widely used as the packaging material. By contrast, the matte film or sheet which has been conventionally used for the wallpaper, the screen, the envelope and various files for writing material or the like which dislike stray light and has suppressed gloss have been said to has effects for enhancing attractiveness and consumer appetite of commodities also in the packaging industry, and has been required. Referring to the matte film or sheet, for example, Patent Document 1 discloses a matte film for wallpaper which is composed of an ethylene-vinyl alcohol copolymer which contains 1% by weight or higher of an inorganic filler and has glossiness of 60% or lower; Patent Document 2 discloses a biaxial drawn polyester matte film for packaging which contains 1% by weight or higher of inactive particles such as inorganic or organic particles having a specific particle diameter and has glossiness of 35% or lower and haze of 80% or lower; and Patent Document 3 discloses an annealed polypropylene matte film having glossiness of 30% or lower and haze of 18% or lower.

However, in view of protecting the natural environment in relation to the disposal of these resin materials, there has been a demand for materials which have low combustion calories, are degradable in the soil and safe. There has been active research on products made of a biodegradable resin such as an aliphatic polyester like a polylactic acid resin, specifically containers or molded articles such as a film, a sheet and a bottle, fibers, non-woven fabric, expanded articles, and composite materials thereof. However, the research on the biodegradable film having improved antifouling characteristic and matting property is few. Patent Document 4 or the like discloses a biodegradable polyester having a glass transposition temperature Tg of 30° C. or higher, for example, a polylactic acid drawn film or sheet which is composed of a polylactic acid resin mainly containing a blend of a polylactic acid resin and biodegradable polyester having a glass transposition temperature Tg of 0° C. or lower. However, although the impact resistance thereof is improved, unfortunately, antifouling characteristic and the matting property are not said to be attained at a practical use level.

For example, Patent Document 5 discloses a polylactic acid drawn film and sheet which contains a polylactic acid resin mainly containing a blend of a polylactic acid resin and inactive particles. That is, there is disclosed a white opaque polylactic acid drawn film which contains 20% by weight of calcium carbonate having an average particle diameter of 0.6 μm, or 15% by weight of a polystyrene resin and 5% by weight of titanium oxide (the weights of the polystyrene resin and titanium oxide are 20% by weight as inactive particles). However, the film having good matting property cannot be obtained only by adding inorganic particles and organic particles. Patent Document 5 has not disclosed the improvement in matting property.

Patent Document 6 discloses a matte film material mainly containing a biodegradable resin. However, the specific example of this film is a film obtained by applying a matte agent onto the surface of a biaxial drawn film of polylactic acid to exhibit matting property. Although general processes which kneads the matte agent in the biodegradable resin and melt-extrusion form have been described, a resin composition for obtaining the biodegradable matting property film which has good film forming stability, processing aptitude and antifouling characteristic is not disclosed at all.

Also, Patent Document 7 discloses a matte film which contains a polylactic acid resin mainly containing a blend of the polylactic acid resin and chemically modified starch. However, the obtained film has a small elongation at break, and becomes a brittle film. Particularly, when the thin film of 20 μm or lower is laminated on the other materials, unfortunately, the film is easily broken.

Patent Document 1: Japanese Patent No. 3172559
Patent Document 2: JP-A-2002-200724
Patent Document 3: JP-B-3175306
Patent Document 4: JP-B-3138196
Patent Document 5: JP-A-2001-49003
Patent Document 6: JP-A-2004-66513
Patent Document 7: JP-A-2004-131726

DISCLOSURE OF THE INVENTION

It is an object of the present invention to provide a biodegradable resin film or sheet which has good film forming stability and processing aptitude, and has excellent antifouling characteristic and matting property.

The present inventors have conducted earnest studies in order to obtain a film which has antifouling characteristic, matting property, film forming stability and processing aptitude using a biodegradable resin. As a result, the present inventors have found that a film or sheet having good film forming stability and processing aptitude, and having antifouling characteristic and matting property could be obtained by using a blend which contains a biodegradable resin containing a specific weight of a biodegradable polyester having a glass transition temperature Tg of 10° C. or lower and biodegradable polyester having a glass transposition temperature Tg of 30° C. or higher, and a filler at a specific ratio to accomplish the present invention.

That is, the present invention is as follows.

(1) A single-layer matte film or sheet comprising a filler and a biodegradable resin (A) comprising a blend of a biodegradable polyester (a1) having a glass transition temperature Tg of 10° C. or lower and a biodegradable polyester (a2) having a glass transition temperature Tg of 30° C. or higher, wherein at least one surface thereof has a surface gloss (Gloss: 45 degree) as measured in accordance with ASTM-D2457-70 of 60% or lower.

(2) The single-layer matte film or sheet according to the item (1), comprising:
45 to 96.9% by weight of the biodegradable resin (A) based on the total weight of the biodegradable resin (A), starch (B), modified starch (C) and plasticizer (D), the resin (A) comprising the blend which contains 5 to 95% by weight of the biodegradable polyester (a1) having a glass transition temperature Tg of 10° C. or lower and 5 to 95% by weight of the biodegradable polyester (a2) having a glass transition temperature Tg of 30° C. or higher, and in which the total of the biodegradable polyesters (a1) and (a2) is 40 to 100% by weight;

3 to 40% by weight of the starch (B) and/or the modified starch (C) as the filler based on the total weight of the biodegradable resin (A), starch (B), modified starch (C) and plasticizer (D); and 0.1 to 15% by weight of the plasticizer (D) based on the total weight of the biodegradable resin (A), starch (B), modified starch (C) and plasticizer (D).

(3) The single-layer matte film or sheet according to the item (2), wherein the biodegradable resin (A) contains 10 to 85% by weight of the biodegradable polyester (a1) having a glass transition temperature Tg of 10° C. or lower and 15 to 90% by weight of the biodegradable polyester (a2) having a glass transition temperature Tg of 30° C. or higher.

(4) The single-layer matte film or sheet according to the item (2), wherein the biodegradable resin (A) contains 15 to 75% by weight of the biodegradable polyester (a1) having a glass transition temperature Tg of 10° C. or lower and 25 to 85% by weight of the biodegradable polyester (a2) having a glass transition temperature Tg of 30° C. or higher.

(5) The single-layer matte film or sheet according to the item (2), wherein 100% by weight of the total of the biodegradable resin (A) contains 10 to 100% by weight of a biodegradable aliphatic-aromatic polyester.

(6) The single-layer matte film or sheet according to the item (2), wherein the biodegradable polyester (a2) having a glass transition temperature Tg of 30° C. or higher is a polylactic acid resin.

(7) The single-layer matte film or sheet according to any one of the items (2) to (6), further comprising 10 parts by weight or lower of an inorganic filler (E) and/or fine particle polymer (F) as the filler based on 100 parts by weight of the total of the biodegradable resin (A), starch (B) and/or modified starch (C), and plasticizer (D).

(8) The single-layer matte film or sheet according to item (2), comprising 70 to 91.9% by weight of the biodegradable resin (A) based on the total weight of the biodegradable resin (A), starch (B) and plasticizer (D) comprising the blend which contains 20 to 50% by weight of the biodegradable polyester (a1) and 50 to 80% by weight of the biodegradable polyester (a2) and in which the total of the biodegradable polyesters (a1) and (a2) is 100% by weight wherein the biodegradable polyester (a1) having a glass transition temperature Tg of 10° C. or lower is an aliphatic-aromatic polyester, and the biodegradable polyester (a2) having a glass transition temperature Tg of 10° C. or higher is a polylactic acid resin, 8 to 25% by weight of the starch (B) as the filler based on the total weight of the biodegradable resin (A), starch (B) and plasticizer (D), and 0.1 to 5% by weight of the plasticizer (D) based on the total weight of the biodegradable resin (A), starch (B) and plasticizer (D); the matte film or sheet being laminated on a surface of a wallpaper and used for fouling prevention.

(9) A multilayer matte film or sheet comprises the single-layer matte films or sheets according to any one of the items (1) to (8), wherein the matte film or sheet is laminated so that a surface of the matte film or sheet having a surface gloss of 60% or lower is at least one outer surface of the multilayer matte film or sheet.

(10) A multilayer matte film or sheet comprises at least two layers, wherein the layers contains:

the single-layer matte film or sheet according to any one of the items (1) to (8) laminated so that a surface having a surface gloss of 60% or lower is one outer surface of the multilayer matte film or sheet; and a layer laminated on the other surface of the multilayer matte film or sheet and containing a resin containing 40% by weight or higher of the biodegradable polyester (a1) having a glass transition temperature Tg of 10° C. or lower.

(11) The multilayer matte film or sheet according to the item (10), wherein the biodegradable polyester (a1) used on the other outer surface and having a glass transition temperature Tg of 10° C. or lower is an aliphatic-aromatic polyester.

(12) The single-layer matte film or sheet according to the item (1), wherein the single-layer matte film or the sheet comprises:

60 to 99% by weight of the biodegradable resin (A) based on the total weight of the biodegradable resin (A), inorganic filler (E) and fine particle polymer (F), the resin (A) comprising the blend which contains 5 to 95% by weight of the biodegradable polyester (a1) having a glass transition temperature Tg of 10° C. or lower and 5 to 95% by weight of the biodegradable polyester (a2) having a glass transition temperature Tg of 30° C. or higher, and in which the total of the biodegradable polyesters (a1) and (a2) is 40 to 100% by weight;

1 to 40% by weight of the inorganic filler (E) and/or the fine particle polymer (F) as the filler based on the total weight of the biodegradable resin (A), inorganic filler (E) and fine particle polymer (F).

(13) The single-layer matte film or sheet according to the item (12), wherein the inorganic filler (E) and/or the fine particle polymer (F) have/has a mean particle diameter of 10 μm or lower.

(14) The single-layer matte film or sheet according to the item (12), wherein 100% by weight of the total of the biodegradable resin (A) contains 10% by weight or higher of a biodegradable aliphatic-aromatic polyester.

(15) The single-layer matte film or sheet according to the item (12), wherein the biodegradable polyester (a2) having a glass transition temperature Tg of 30° C. or higher is a polylactic acid resin; and the biodegradable resin (A) contains 10 to 90% by weight of the polylactic acid resin.

(16) The single-layer matte film or sheet according to the item (12), further comprising 15% by weight or lower of the starch (B) and/or modified starch (C) based on the total weight of the biodegradable resin (A), and inorganic filler (E) and/or fine particle polymer (F).

(17) The single-layer matte film or sheet according to any one of the items (12) to (16), wherein the single-layer matte film or sheet is laminated on a surface of a wallpaper and used for fouling prevention.

(18) A multilayer matte film or sheet comprises the single-layer matte films or sheets according to any one of the items (12) to (17) laminated so that a surface having a surface gloss of 60% or lower is at least one outer surface.

(19) A multilayer matte film or sheet comprises at least two layers, wherein two layers contains:

the single-layer matte film or sheet according to any one of the items (12) to (17) laminated so that a surface having a surface gloss of 60% or lower is one outer surface; and a layer laminated on the other surface and containing a resin containing 40% by weight or higher of the biodegradable polyester (a1) having a glass transition temperature Tg of 10° C. or lower.

(20) The multilayer matte film or sheet according to the item (19), wherein the biodegradable polyester (a1) used on the other outer surface and having a glass transition temperature Tg of 10° C. or lower is an aliphatic-aromatic polyester.

(21) A method for producing the matte film or sheet according to any one of the items (1) to (20), comprising the steps of:

selecting a resin non-adhesive to at least one surface of the matte film or sheet;

bringing the surface of the matte film or sheet into contact with the non-adhesive resin layer to form a co-extruded film or sheet; and then removing the non-adhesive resin layer to provide the matte film or sheet.

(22) A packaging material comprises the matte film or sheet according to any one of the items (1) to (20).

(23) An agricultural material comprises the matte film or sheet according to any one of the items (1) to (20).

(24) A wallpaper has a surface on which the matte film or sheet according to any one of the items (1) to (20) is laminated.

(25) An indoor decoration has a surface on which the matte film or sheet according to any one of the items (1) to (20) is laminated.

(26) An article for everyday, school supplies, writing material or a notebook has a surface on which the matte film or sheet according to any one of the items (1) to (20) is laminated.

(27) A paper product has a surface on which the matte film or sheet according to any one of the items (1) to (20) is laminated.

(28) A cloth product has a surface on which the matte film or sheet according to any one of the items (1) to (20) is laminated.

(29) A light diffusing plate has a surface on which the matte film or sheet according to any one of the items (1) to (20) is laminated.

(30) A screen having a surface on which the matte film or sheet according to any one of the items (1) to (20) is laminated.

Since the biodegradable resin (A) as a main component in the matte film or sheet of the present invention having antifouling characteristic has biodegradability, the matte film or sheet is advantageous in view of natural environment protection also in discarding the matte film or sheet after use. Even when the surface of the matte film or sheet becomes dirty, the matte film or sheet has a dirt prevention function capable of removing dirt using detergent, water and an eraser or the like, and has good film forming stability and processing aptitude. Furthermore, the matte film or sheet is independently used, or used with the matte film or sheet laminated on the other materials, and has effects for applying antifouling characteristic and matting property to a packaging material and an agricultural material; and effects for suppressing gloss to a wallpaper, a screen, an indoor decoration, an article for everyday, school supplies, a writing material, a notebook, a paper product (containing a paper container and a sliding-screen paper), a cloth product, a fiber product, and a tablecloth or the like to apply settled appearance having high grade, a dirty prevention function, and a function for diffusing light in a light diffusing plate.

BEST MODE FOR CARRYING OUT THE INVENTION

Hereinafter, particularly, the present invention will be specifically described focused on the preferred mode.

A matte film or sheet of the present invention having antifouling characteristic is mainly composed of a blend containing a biodegradable resin (A) ultimately decomposed by microorganisms and a filler.

As described in pages 30 to 32 of "Resin/Filler Kneading Technology" (publisher: Kazuhiro Takausu, the first print published date: Mar. 31, 2000) published by TECHNICAL INFORMATION INSTITUTE CO., LTD., examples of the fillers used in the invention include oxides, hydroxides, carbonates, sulfates, silicates, nitrides, the other inorganic compounds, carbons, organic matters (including fine particle polymers composed of organic powder and resin such as starch and modified starch) according to each composition. Also, the fillers are classified into a fiber, needle, tabular, spherical, granular and the other shapes according to each shape.

Of these, it is preferable that referring to the shape of the filler, a thin film of 15 μm or lower containing the spherical or granular filler is hardly broken in forming the film, and has excellent film forming stability. According to each composition of the filler, it is preferable that the flexible organic filler hardly tears the thin film of 15 μm or lower in forming the film, and the film has excellent film forming stability as compared with the inorganic filler having high hardness. Since the mean particle diameter of the filler affects the breaking of the film in forming the thin film of 15 μm or lower, preferably, the filler has the mean particle diameter of 10 μm or lower. More preferably, the filler has the mean particle diameter of 5 μm or lower, particularly preferably the mean particle diameter of 3 μm or lower, and is dispersed in a matrix resin forming the film.

Preferable examples of the fillers include inorganic fillers represented by talc; fine particle polymers represented by silicon resins or silicon rubber fine particles; and fillers such as starch and modified starch. The starch is particularly preferable in view of the shape, softness, mean particle diameter and biodegradability thereof. That is, the starch has more excellent film forming stability and processing aptitude than that of the talc in view of the particle shape and softness thereof. Preferably, the starch has an almost spherical particle shape as compared with the modified starch such as the denatured chemically starch; the starch having the particle diameter of about 2 to 3 μm is easily and uniformly dispersed; and the starch has excellent matting property in addition to the film forming stability and the processing aptitude.

First, a matte film using the starch and/or the modified starch as the filler will be specifically described. In order to obtain the matte film or sheet of the present invention which has antifouling characteristic, referring to the weight proportion of each component of a blend of a biodegradable resin (A) comprising a blend which contains of a biodegradable polyester (a1) having a glass transition temperature Tg of 10° C. or lower and a biodegradable polyester (a2) having a glass transition temperature Tg of 30° C. or higher, and in which the total of the biodegradable polyesters (a1) and (a2) is 40 to 100% by weight, starch (B) and/or modified starch (C), and plasticizer (D) (the total of the biodegradable resin (A), starch (B), modified starch (C) and plasticizer (D) is 100% by weight), preferably, the weight proportion of the biodegradable resin (A) is 45 to 96.9% by weight; the weight proportion of the starch (B) and/or modified starch (C) is 3 to 40% by weight; and the weight proportion of the plasticizer (D) is 0.1 to 15% by weight. More preferably, the film or the sheet comprises the blend of 50 to 96.9% by weight of the biodegradable resin (A), 3 to 40% by weight of the starch (B) and/or modified starch (C), and 0.1 to 10% by weight of the plasticizer (D). Still more preferably, the film or the sheet comprises the blend of 57 to 92.9% by weight of the biodegradable resin (A), 7 to 35% by weight of the starch (B) and/or modified starch (C), and 0.1 to 8% by weight of the plasticizer (D). Still more preferably, the film or the sheet comprises the blend of 63 to 87.9% by weight of the biodegradable resin (A), 12 to 32% by weight of the starch (B) and/or modified starch (C), and 0.1 to 5% by weight of the plasticizer (D). Particularly preferably, the film or the sheet comprises the blend of 70 to 91.9% by weight of the biodegradable resin (A), 8 to 25% by weight of the starch (B) and/or modified starch (C), and 0.1 to 5% by weight of the plasticizer (D).

When the weight proportion of the starch (B) and/or modified starch (C) exceeds 40% by weight, the obtained film or sheet tends to have inferior mechanical properties, become brittle, and have reduced film forming stability. Also, since the film or the sheet has reduced flexibility, and does not follow irregularities in producing lamination products having the irregularities formed by emboss processing or the like, the film or the sheet tends to have worsened irregularities transfer property and worsened adhesiveness to the substrate. When the content of the starch (B) is particularly less than 30% by weight, the film forming stability and the processing aptitude of the film or sheet are preferably enhanced. When the weight proportion of the plasticizer (D) exceeds 15% by weight, the film tends to cause blocking easily. Therefore, in order to obtain the film which has good film forming stability and does not cause blocking, the content of the biodegradable resin (A) is preferably 45% by weight or higher. When the weight proportion of the starch (B) and/or modified starch (C) is less than 3% by weight, the film has inferior matting property, and thereby it is difficult to obtain the film having a surface gloss (Gloss: 45 degree) as measured in accordance with ASTM-D2457-70 of 60% or lower and having good matting property. The weight proportion of the starch (B) is particularly preferably 8% by weight or higher in view of the matting property. In addition, the weight proportion of the plasticizer (D) is preferably 0.1% by weight or higher in order to uniformly disperse the starch (B) and/or the modified starch (C) in the biodegradable resin (A). Therefore, in order to obtain the blend which has a surface gloss of 60% or lower and has the starch (B) and/or modified starch (C) uniformly dispersed in the biodegradable resin (A), the content of the biodegradable resin (A) is preferably 96.9% by weight or lower.

Also, preferably, the biodegradable resin (A) used for the matte film or sheet of the present invention which has antifouling characteristic comprises a blend which comprises 5 to 95% by weight of the biodegradable polyester (a1) having a glass transition temperature Tg of 10° C. or lower and 5 to 95% by weight of the biodegradable polyester (a2) having a glass transition temperature Tg of 30° C. or higher in the total amount, and in which the total amount of the biodegradable polyesters (a1), (a2) is 40 to 100% by weight. More preferable biodegradable resin (A) comprises a blend which contains 10 to 85% by weight of the biodegradable polyester (a1) and 15 to 90% by weight of the biodegradable polyester (a2) in the total of the resin, and in which the total of the biodegradable polyesters (a1) and (a2) is 50 to 100% by weight. Still more preferable biodegradable resin (A) comprises a blend which contains 15 to 75% by weight of the biodegradable polyester (a1) and 25 to 85% by weight of the biodegradable polyester (a2), and in which the total of the biodegradable polyesters (a1) and (a2) is 60 to 100% by weight. Still more preferable biodegradable resin (A) comprises a blend which contains 20 to 65% by weight of the biodegradable polyester (a1) and 35 to 80% by weight of the biodegradable polyester (a2), and in which the total of the biodegradable polyesters (a1) and (a2) is 70 to 100% by weight. Particularly preferable biodegradable resin (A) comprises a blend which contains 20 to 50% by weight of the biodegradable polyester (a1) and 50 to 80% by weight of the biodegradable polyester (a2), and in which the total of the biodegradable polyesters (a1) and (a2) is 100% by weight.

When (a1) is less than 5% by weight or (a2) exceeds 95% by weight, the film tends to have inferior processing aptitude and little elongation, and become brittle. When the weight proportion of (a1) exceeds 95% by weight and the weight proportion of (a2) is less than 5% by weight, the film tends to have excellent processing aptitude and elongation, and inferior antifouling characteristic. When the biodegradable resin (A) comprises a blend in which the total of (a1) and (a2) is less than 40% by weight, the film tends to have inferior balance of processing aptitude, elongation and antifouling characteristic. The biodegradable resin (A) of (a1), (a2) used in the present invention is a polymer in which biodegradable degree as measured in accordance with at least one of biodegradable tests (: OECD 301 C, JIS K6950 (2000), JIS K6951 (2000), or JIS K6953 (2000)) specified by the Identification and Labeling Committee of the Biodegradable Plastic Society is 60% or higher within a period described in each test method.

The biodegradable polyester (a1) which is used in the present invention and has a glass transition temperature Tg of 10° C. or lower is at least one polyester selected from: a polycondensed aliphatic polyester derived mainly from an aliphatic dicarboxylic acid and an aliphatic diol; an aliphatic polyester prepared by ring-opening polymerization of cyclic lactones; a synthetic aliphatic polyester; an aliphatic polyester such as poly(hydroxyalkanoic acid) biosynthesized in microorganisms; and an aliphatic-aromatic polyester having a structure where a part of the biodegradable polyester is replaced with an aromatic compound in the range where biodegradability is not deteriorated. The polyester is a polymer composition which contains one or two or more of the biodegradable polyesters having a glass transition temperature Tg of 10° C. or lower, preferably 0° C. or lower, and more preferably −20° C. or lower in the differential scanning calorimetry (JIS-K-7121). When the Tg of the biodegradable polyester (a1) exceeds 10° C., the processability and elongation of the film to be obtained are often reduced.

The polycondensed aliphatic polyester derived mainly from an aliphatic dicarboxylic acid and an aliphatic diol includes condensates derived from at least one selected from each of aliphatic carboxylic acids (may contain aromatic carboxylic acid such as terephthalic acid and isophthalic acid in the range where biodegradability is not deteriorated) such as succinic acid, glutaric acid adipic acid, suberic acid, azelaic acid, sebacic acid and dodecandionic acid and aliphatic diols such as ethylene glycol, 1,3-propylene glycol, 1,4-butane diol and 1,4-cyclohexane dimethanol (CHDM). The aliphatic polyester prepared by ring-opening polymerization of cyclic lactones includes at least one ring-opening polymer selected from cyclic monomers such as ε-caprolactone, δ-valerolactone, β-methyl-δ-valerolactone.

The synthetic aliphatic polyester includes a copolymer of succinic acid anhydride and ethylene oxide and a copolymer of cyclic acid anhydride such as propylene oxide and oxiranes. Examples of poly(hydroxyalkanoic acids) biosynthesized in microorganisms include poly(3-hydroxybutyric acid), poly(3-hydroxypropionic acid), a poly(3-hydroxyvaleric acid), a poly(3-hydroxybutyric acid-3-hydroxyvaleric acid)copolymer, a poly(3-hydroxybutyric acid-3-hydroxyhexanoic acid)copolymer, a poly(3-hydroxybutyric acid-3-hydroxypropionic acid)copolymer, a poly(3-hydroxybutyric acid-4-hydroxybutyric acid)copolymer, a poly(3-hydroxybutyric acid-3-hydroxyoctanoic acid)copolymer, and a poly(3-hydroxybutyric acid-3-hydroxydecanoic acid)copolymer.

Examples of the aliphatic-aromatic polyesters include a polybutylene succinate phthalate copolymer, a polyethylene succinate phthalate copolymer, a polybutylene adipate phthalate copolymer, a polyethylene adipate phthalate copolymer, a polyethylene glutarate terephthalate copolymer, a poly butylene glutarate terephthalate copolymer, a polybutylene succinate adipate phthalate copolymer, an (ethylene glycol, 1,4 cyclohexanedimethanol (CHDM), succinic acid, and terephthalic acid)copolymer, a (butanediol, CHDM, adipic acid and phthalic acid)copolymer, an (ethylene glycol, CHDM, adipic acid and phthalic acid)copolymer, an (ethylene glycol, CHDM, glutarate and terephthalic acid)copolymer, a copolymer (butanediol, CHDM, glutaric acid and terephthalic acid)copolymer, and a (butanediol, CHDM, succinic acid, adipic acid and phthalic acid)copolymer.

Particularly preferable biodegradable polyester (a1) used in the present invention and having a glass transition temperature Tg of 10° C. or lower is an aliphatic-aromatic polyester having biodegradability. Specific examples include a polybutylene succinate phthalate copolymer, a polyethylene succinate phthalate copolymer, a polybutylene adipate phthalate copolymer, a polyethylene adipate phthalate copolymer, a polyethylene glutarate terephthalate copolymer, a polybutylene glutarate terephthalate copolymer, and a polybutylene succinate adipate phthalate copolymer. Particularly preferably, the aliphatic-aromatic polyester having a glass transition temperature Tg of 10° C. or lower and biodegradability has effects capable of uniformly dispersing starch from compatibility with starch and well exhibiting matting property as the addition effect of the starch, in addition to effects for applying flexibility to a film to be obtained, and effects for enhancing film forming stability.

As the polymerization method for obtaining the biodegradable polyester (a1), known processes such as direct processes and indirect processes, can be employed. The direct process comprises conducting polycondensation by selecting an anhydride acid or derivative of the above-exemplified dicarboxylic compounds as an aliphatic dicarboxylic acid component and the above-exemplified diol compounds or derivative thereof as an aliphatic diol compound, and produces a polyester having a high molecular weight by removing water generated during the polycondensation. In the indirect process, a polyester having a high molecular weight can be produced by adding a small weight proportion of a chain extension agent, for example, a diisocyanate compound such as hexamethylene diisocyanate, isophorone diisocyanate, xylylene diisocyanate and diphenylmethane diisocyanate to the oligomer polycondensed in the direct process. The weight average molecular weight of the biodegradable polyester (a1) is preferably in the range of 20,000 to 500,000, more preferably 50,000 to 250,000. The film having a molecular weight of less than 20,000 may not exhibit sufficient practical physical properties such as mechanical strength and impact strength, and that having a molecular weight of more than 500,000 may be inferior in molding processability.

The biodegradable polyester (a2) which is used in the present invention and has a glass transition temperature Tg of 30° C. or higher is at least one polyester selected from: a polycondensed aliphatic polyester derived mainly from an aliphatic dicarboxylic acid and an aliphatic diol; an aliphatic polyester prepared by ring-opening polymerization of cyclic lactones; a synthetic aliphatic polyester; an aliphatic polyester such as poly(hydroxyalkanoic acid) biosynthesized in microorganisms; and an aliphatic-aromatic polyester having a structure where a part of the biodegradable polyester is replaced with an aromatic compound in the range where biodegradability is not deteriorated. The polyester is a polymer composition which contains one or two or more of the biodegradable polyesters having a glass transition temperature Tg of 30° C. or higher, preferably 40° C. or higher, and more preferably 45° C. or higher in the differential scanning calorimetry (JIS-K-7121). When the Tg of the biodegradable polyester (a2) is less than 30° C., antifouling characteristic of the obtained film is often reduced.

Examples of the biodegradable polyesters (a2) having a glass transition temperature Tg of 30° C. or higher include the following. Examples of the biodegradable polyesters obtained by condensing and polymerizing the hydroxycarboxylic acid include polylactic acid and a copolymer thereof. Examples of the polycondensed biodegradable aliphatic-aromatic polyesters derived mainly from a dicarboxylic acid and a diol include a dicarboxylic acid containing an aromatic carboxylic acid such as a terephthalic acid and an isophthalic acid in the range where the biodegradability is not hindered, condensates prepared by selecting at least one from diols such as ethylene glycol, 1,3-propylene glycol, 1,4-butane diol, 1,4-cyclohexanedimethanol (CHDM), and 1,4-di(hydroxymethyl)benzene.

Specific examples of the condensates include a polybutylene succinate phthalate copolymer, a polyethylene succinate phthalate copolymer, a polybutylene adipate phthalate copolymer, a polyethylene adipate phthalate copolymer, a polyethylene glutarate terephthalate copolymer, a polybutylene glutarate terephthalate copolymer, a polybutylene succinate adipate phthalate copolymer, an (ethylene glycol, 1,4-cyclohexane dimethanol (CHDM), succinic acid and terephthalic acid)copolymer, a (butanediol, CHDM, adipic acid and phthalic acid)copolymer, an (ethylene glycol, CHDM, adipic acid and phthalic acid)copolymer, an (ethylene glycol, CHDM, glutaric acid, and terephthalic acid)copolymer, a (butanediol, CHDM, glutaric acid and terephthalic acid)copolymer, and a (butanediol, CHDM, succinic acid, adipic acid and phthalic acid)copolymer. Preferable examples of the biodegradable polyesters (a2) include polylactic acid, a copolymer thereof, a biodegradable polyethylene phthalate copolymer, a biodegradable polybutylene phthalate copolymer. More preferable examples of the biodegradable polyesters (a2) include polylactic acid and a copolymer thereof.

The polylactic acid and the copolymer thereof are a polylactic acid homopolymer, a copolymer containing 50% by weight or higher of a lactic acid monomeric unit, or a blend thereof. The polylactic acid and the copolymer are a polylactic acid homopolymer, a copolymer of lactic acid and a compound selected from the group consisting of the other hydroxycarboxylic acids and lactones, or a blend thereof. When the content of the lactic acid monomeric unit is less than 50% by weight, antifouling characteristic of the film tends to be reduced. Preferably, the polylactic acid and the copolymer thereof is the polylactic acid homopolymer, the copolymer containing the lactic acid monomeric unit of 80% by weight or higher, or the blends thereof. More preferably, the polylactic acid and the copolymer thereof are the polylactic acid homopolymer, the copolymer containing the lactic acid monomeric unit 90% by weight or higher, or the blend thereof.

Examples of the monomers used as a copolymerizable component with the lactic acid include the following.

Examples of hydroxycarboxylic acids include glycol acid, 3-hydroxybutyric acid, 4-hydroxybutyric acid, 3-hydroxyvaleric acid, 4-hydroxyvaleric acid and 6-hydroxycaproic acid. Examples of alicyclic esters include glycolide, lactide, β-propiolactone, γ-butyrolactone, δ-valerolactone, ε-caprolactone, and lactones wherein various groups such as a methyl group are substituted. Examples of the dicarboxylic acids include succinic acid, glutaric acid, adipic acid, azelaic acid, sebacic acid, terephthalic acid, and isophthalic acid. Examples of the polyvalentalcohols include aromatic polyvalentalcohols such as reaction products produced by reacting bisphenol and ethylene oxide; aliphatic polyvalentalcohols such as ethylene glycol, propylene glycol, butane diol, hexane diol, octane diol, glycerine, sorbitane, trimethylol propane, and neopentyl glycol; and ether glycol such as diethylene glycol, triethylene glycol, polyethylene glycol and polypropylene glycol.

As the polymerization method for obtaining the biodegradable polyester (a2) having a glass transition temperature Tg of 30° C. or higher, known methods such as a condensation polymerization method and a ring-opening polymerization method can be employed. There can be used a method for increasing a molecular weight using a binder such as polyisocyanate, a polyepoxy compound, acid anhydride and polyfunctional acid chloride. The weight average molecular weight of the biodegradable polyester (a2) having a glass transition temperature Tg of 30° C. or higher is preferably 10000 to 1000000. When the molecular weight is less than 10000, the mechanical properties of the film tend to be insufficient. When the molecular weight exceeds 1000000, the melt viscosity is increased, and the film having stabilized physical properties is hardly obtained in a usual process machine.

The biodegradable resin (A) other than the biodegradable polyesters (a1), (a2) used in the present invention is a polymer in which biodegradable degree measured in accordance with at least one of the biodegradable test (: OECD 301 C, JIS K6950 (2000), JIS K6951 (2000), or JIS K6953 (2000)) specified by the Identification and Labeling Committee of the Biodegradable Plastic Society is 60% or higher within a period described in each test method. Specific examples of microbiologically produced polymers include polyhydroxybutyrate, a polyhydroxybutyratevalerate copolymer and polyhydroxyalkanoate. Examples of chemically synthesized polymers are as follows: examples of the aliphatic polyesters containing polyhydroxy acid in a chemical synthesis system include polycaprolactone, polyglycol acid and a poly(glycolate/lactate)copolymer; examples of the aliphatic polyesters containing the diol and the dicarboxylic acid include polyethylene succinate, polybutylene succinate and poly(butylene succinate/adipate); examples of the aliphatic polyester carbonates include poly(butylene succinate/carbonate); examples of the aliphatic-aromatic polyesters include a copolymer (for example, poly(butylene succinate/terephthalate), poly(butylene adipate terephthalate) and poly(ethylene terephthalate/adipate)) of aromatic dicarboxylic acid such as phthalic acid, aliphatic dicarboxylic acid such as succinic acid and adipic acid, and aliphatic diol such as ethylene glycol, propylene glycol and butanediol. The other examples include biodegradable polyvinyl alcohol. Examples in a natural product utilizing system include acetylcellulose, chitin, chitosan, a blend of a plurality of biodegradable resins, and a copolymer ester-exchanged.

Preferably, the biodegradable aliphatic-aromatic polyester used in the present invention is a biodegradable aliphatic-aromatic polyester containing 5 mol % or higher of an aromatic monomer in the range where the biodegradability is not lost. The biodegradable polyester (a1) having a glass transition temperature Tg of 10° C. or lower may contain the aliphatic-aromatic polyester, and the biodegradable polyester (a2) having a glass transition temperature Tg of 30° C. or higher may contain the aliphatic-aromatic polyester. Preferably, the total of 100% by weight of the biodegradable resin (A) contains 10 to 100% by weight of the biodegradable aliphatic-aromatic polyester. More preferably, the total of 100% by weight of the biodegradable resin (A) contains 15 to 100% by weight of the biodegradable aliphatic-aromatic polyester, and particularly preferably, the total of 100% by weight of the biodegradable resin (A) contains 20 to 100% by weight of the biodegradable aliphatic-aromatic polyester. When the total of 100% by weight of the biodegradable resin (A) contains the biodegradable aliphatic-aromatic polyester of less than 10% by weight, the hydrolysis resistant of the film or sheet to be obtained tends to be inferior.

Examples of the starches (B) and/or modified starches (C) used in the present invention include the following ones. The starch (B), which is one of biomasses produced by the photosynthetic reaction of green plant, is a substance stored in organizations such as the seed, root and stem tuber of many plants, as described in pages 40 to 43 of "Plant Metabolism Engineering Handbook" (supervising editor: Atsuhiko Niina, Kazuya Yoshida, publisher: Takashi Yoshida, the first print published date: Jun. 25, 2002) published by NTS Inc. The starch is a substance which is widely distributed over the plant world, is particularly and extensively accumulated in the storage tissue of cereals such as rice, wheat and corn, and potatoes such as potato, sweet potato and cassava, and has served as a food for human beings and many animals from ancient times. The starch may be obtained from various kinds of starches [molecular formula $(C_6H_{10}O_5)_n$] which are a blend of amylose (linear polymer) and amylopectin (branched polymer), for example, cornstarch, potato starch, tapioca starch, rice starch, wheat starch and cassava starch or the like. Examples of the modified starches (C) include starch derivatives such as broken starch, starch ester, starch ether or polyester-grafted starch as the derivative from the above various kinds of starches. Preferable examples of the modified starches (C) include starch aliphatic ester classified into starch ester. Preferably, the matting property of the matte film containing the starch (B) and/or the modified starch (C) is not easily disappeared after the lamination due to heat. When the starch (B) is particularly used, the starch (B) is not easily influenced by matrix resin compositions and film forming conditions or the like, and particles having the particle diameter of 2 to 3 μm and having an almost spherical shape are easily formed. Therefore, as compared with the case of using the modified starch (C) which is easily influenced by the matrix resin compositions and the film forming conditions and in which the particle diameter and the particle shape is easily changed, the use of the starch (B) is excelled in view of the film forming stability, the processing aptitude, and the matting property.

The plasticizer (D) used in the present invention can be selected and used from those commonly used in this field. Preferred are those which do not bleed out and is a harmless and safe substance for a human body. Examples of the plasticizers include phthalate ester, aliphatic dibasic acid ester, hydroxy-polycarboxylic acid ester, polyvalentalcohol ester, fatty acid ester, phosphate ester, an epoxy plasticizer, and aliphatic polyvalentalcohol. More preferable plasticizers are aliphatic dibasic acid ester, hydroxy-polycarboxylic acid ester, polyvalentalcohol ester, fatty acid ester, an epoxy plasticizer, and aliphatic polyvalentalcohol. Still more preferable plasticizers are ester and aliphatic polyvalentalcohol synthesized from two or more selected from the group consisting of aliphatic carboxylic acids, aliphatic hydroxycarboxylic acids and aliphatic alcohols. Particularly preferable plasticizer is aliphatic polyvalentalcohol for the starch (B) and ester synthesized from two or more selected from the group consisting of the aliphatic carboxylic acids having carbon numbers of 20 or lower, aliphatic hydroxycarboxylic acids having carbon numbers of 20 or lower, and aliphatic alcohols having carbon numbers of 20 or lower for the modified starch (C).

Examples of the phthalate esters include dimethyl phthalate, diethyl phthalate, diisobutyl phthalate, dibutyl phthalate and dioctyl phthalate. Examples of the aliphatic dibasic acids include diisodecyl succinate, dioctyl adipate, diisodecyl adipate, dioctyl azelate, dibutyl sebacate and dioctyl sebacate. Examples of the hydroxy-polycarboxylic acid esters include acetyl tributyl citrate (ATBC), acetyl tri-2-ethylhexyl citrate and tributyl citrate. Particularly preferred is ATBC. Examples of the polyvalentalcohol esters include glycerine triacetate, glycerine tributyrate, an acetyl monoglyceride plasticizer, diethylene glycol dibenzoate, dipentaerithritol hexaester and pentaerythritol ester. Examples of the fatty acid esters include butyl oleate, methyl acetyl ricinolate, chlorinated fatty acid methyl, and adipic acid ethers/esters. Examples of the phosphate esters include trioctyl phosphate and trichloroethyl phosphate. Examples of the epoxy plasticizers include epoxidized soybean oil, epoxidized flaxseed oil, epoxy butylstearate and epoxy octylstearate. Examples of the aliphatic polyvalentalcohols include polyvalentalcohols which have two hydroxyl groups in a molecule, and examples of the polyvalentalcohols include ethylene glycol, propylene glycol and butanediol. Examples of polyvalentalcohols which have 3 or more hydroxyl groups in a molecule include glycerine, pentaerythritol, sorbitol and trimethylol propane. Particularly preferred is glycerine.

Preferably, the matte film or sheet of the present invention which has antifouling characteristic, further comprises 0.1% by weight or higher and 10% by weight or lower of an inorganic filler (E) and/or a fine particle polymer (F) based on the total weight of the biodegradable resin (A), starch (B) and/or modified starch (C), and plasticizer (D). Since the addition of the inorganic filler (E) and/or fine particle polymer (F) exhibits effects for improving matting spots of the film or sheet to exhibit uniform matting property, effects for enhancing the surface hardness of the film, and effects of enhancing antifouling characteristic, the effects are preferably selected according to the use and the purpose. When the content of the inorganic filler (E) and/or fine particle polymer (F) is less than 0.1% by weight based on the total weight of the biodegradable resin (A), starch (B) and/or modified starch (C), and plasticizer (D), the addition effect of the inorganic filler (E) and/or fine particle polymer (F) is hardly obtained. When the content exceeds 10% by weight, improvement effects caused by the addition tends to be saturated, and effects to be obtained are reduced relative to the increase in the addition amount to be economically disadvantageous. When the content of the inorganic filler (E) and/or fine particle polymer (F) exceeds 10% by weight, the total weight of the starch (B) and/or modified starch (C), and inorganic filler (E) and/or fine particle polymer (F) tends to be increased to reduce the film forming stability.

The inorganic fillers (E) used in the present invention are described on pages 30, 31 of "Resin/Filler Kneading Technology" (publisher: Kazuhiro Takausu, the first print published date: Mar. 31, 2000) published by TECHNICAL INFORMATION INSTITUTE CO., LTD. Examples of the inorganic fillers (E) include oxide, hydroxide, carbonate, sulfate, silicate, nitride, carbons and the other inorganic filler. Examples of the oxides include silica, diatomite, alumina, zinc oxide, titanium oxide, calcium oxide, magnesium oxide, iron oxide, tin oxide, antimony oxide and ferrites. Examples of the hydroxides include calcium hydroxide, magnesium hydroxide, aluminium hydroxide and basic magnesium. Examples of the carbonates include calcium carbonate, magnesium carbonate, zinc carbonate, barium carbonate, dawsonite and hydrotalcite. Examples of the sulfate include calcium sulfate, barium sulfate and a gypsum fiber. Examples of the silicates include silicate calcium (wollastonite, xonotlite), talc, clay, mica, montmorillonite, bentonite, activated earth, sepiolite, imogolite, sericite, glass fiber, glass bead and silica barun. Examples of the nitrides include aluminum nitride, boron nitride and silicon nitride. Examples of the carbons include carbon black, graphite, carbon fiber, carbon barun and charcoal powder. Examples of the other inorganic fillers include potassium titanate, lead zirconate titanate, alumiborate, molybdenum sulfide, silicon carbide, zinc borate and a slag fiber.

Preferably, the inorganic filler (E) used in the present invention has a tabular, spherical and granular shape. Examples of the tabular fillers include talc, mica, sericite, glass flakes, tabular calcium carbonate, tabular aluminum hydroxide and hydrotalcite. Examples of the spherical and granular fillers include calcium carbonate, silica, clay, various ore crushed products, various beads, various balloons and tetrapod type zinc oxide. More preferable examples include talc, calcium carbonate, clay, silica, mica, sericite and titanium oxide. Particularly preferable examples include talc, mica, calcium carbonate and silica.

Preferably, the inorganic filler (E) used in the present invention has a mean particle diameter of 10 μm or lower, more preferably, the mean particle diameter of 7 μm or lower, and still more preferably, the mean particle diameter of 0.1 μm or higher and 5 μm or lower. When the inorganic filler having the mean particle diameter exceeding 10 μm is used, the film is torn, or holes are formed on the film by the inorganic filler as defects in the case where a thin film of 20 μm or lower is produced. Thereby, the film forming stability tends to be reduced. The mean particle diameter of the inorganic filler is measured using a laser diffraction/scatter type particle size distribution measuring device.

The fine particle polymer (F) used in the present invention is composed of a synthetic polymer, a natural polymer, encapsulated powder and composite powder or the like, as described in pages 257 to 259 of "Frontier Technology of Ultrafine Particle Polymer" (supervising editor: Soichi Muroi, publisher: Tsuruo Sakai, the first print published date: Apr. 26, 1991) published by CMC CO., LTD. The specific examples are described as the fine particle polymer in "Chapter 6, Fine particle Polymer Product List" in pages 283 to 294. That is, specific examples include fine particle polymers obtained from resins such as a styrene resin, a divinylbenzen resin, a phenol resin, silicone rubber, a silicone resin, low density polyethylene, high density polyethylene, an ethylene/acrylic acid resin, a methyl methacrylate (MMA) resin, a polytetrafluoroethylene (PTFE) resin, a vinylidene fluoride resin, a urethane resin, an acetylcellulose resin, cellulose, a styrene/acrylic resin, a benzoguanamine resin, a benzoguanamine/melamine resin, a melamine resin, an n-butyl acrylate resin, a urea resin, a nylon resin, a polyacetal resin, a polyphenylene ether resin, a polycarbonate resin, a polyethylene terephthalate resin, a polybutylene terephthalate resin, the other engineering resin, a polyether ether ketone (PEEK) resin, a polyarylate resin, a polyethersulfone resin and a polyetherimide resin.

Preferably, the fine particle polymer (F) used in the present invention is composed of a resin satisfying any one of (1) a glass transition temperature Tg of 60° C. or higher, (2) a melting point Tm of 100° C. or higher, or (3) a polymer crosslinked. More preferably, the fine particle polymer (F) used in the present invention is composed of a resin satisfying any one of (1) a glass transition temperature Tg of 80° C. or higher, (2) a melting point Tm of 120° C. or higher, or (3) a polymer having a glass transition temperature Tg of 60° C. or higher and crosslinked.

Preferably, the fine particle polymer (F) used in the present invention has a mean particle diameter of 10 µm or lower, more preferably, 7 µm or lower, and still more preferably, 5 µm or lower. The fine particle polymer (F) contains at least one fine particle polymer selected from the group consisting of a silicone resin, silicone rubber, a polytetrafluoroethylene (PTFE) resin, a styrene resin, a divinylbenzen resin, a polyacetal resin, an acrylic resin, an acetylcellulose resin, a phenol resin, a melamine resin, a benzoguanamine resin, a benzoguanamine/melamine resin, an epoxy resin and a nylon resin. Particularly preferable fine particle polymer (F) has a mean particle diameter of 0.1 to 3 µm, and contains at least one fine particle polymer selected from the group consisting of a silicone resin, a silicone rubber, a polytetrafluoroethylene (PTFE) resin, a styrene resin, a divinylbenzen resin, a polyacetal resin, an acrylic resin, an acetylcellulose resin, a phenol resin, a melamine resin, a benzoguanamine resin, a benzoguanamine/melamine resin, an epoxy resin and a nylon resin. When the mean particle diameter of the fine particle polymer exceeds 10 µm, defects easily tends to occur in forming a thin film of 20 µm or lower to reduce the film forming stability of the film. The mean particle diameter of the fine particle polymer is measured using a laser diffraction/scattering particle size distribution measuring device.

The matte film or sheet of the present invention is required to have at least one surface having a surface gloss (Gloss: 45 degree) as measured in accordance with a gloss meter (ASTM-D2457-70) of 60% or lower. Preferably, the film or sheet has a surface gloss (Gloss: 45 degree) of 30% or lower, more preferably 20% or lower, and particularly preferably 10% or lower. The film or sheet having a gloss exceeding 60% has inferior matting property.

As raw material resins used for the matte film or sheet of the present invention, a recycling raw material pelletized or fine-powdered by reprocessing trim waste or the like generated in forming the resin film in addition to the above virgin materials can be independently used, or used by mixing the recycling material with the virgin materials.

Additives usually used in the technical field, if required, for example, an antioxidant, a heat stabilizer, a hydrolysis depressant, a ultraviolet absorber, a lubricant, an antistatic agent, a fire retardant, a nucleation agent, a crosslinking agent, a colorant, an antibacterial agent, an fungicide and a deodorizer or the like can be incorporated in the matte film or sheet of the present invention in the range where the requirement and the characteristic of the present invention are not impaired.

Examples of the antioxidants include hindered phenolic antioxidants such as p-t-butylhydroxy toluene and P-t-butyl hydroxyanisol. Examples of the heat stabilizer include triphenyl phosphate, trilauryl phosphate and trisnolylphenyl phosphate. Examples of the hydrolysis depressants include carbodiimide compounds and isocyanate compounds. Preferred is a carbodiimide compound. Examples of the ultraviolet absorbers include p-t-butylphenyl salicylate, 2-hydroxy-4-methoxybenzophenone, 2-hydroxy-4-methoxy-2'-carboxy benzophenone and 2,4,5-trihydroxybutyrophenone. Examples of the lubricants include stearamide, erucamide, calcium stearate, zinc stearate, barium stearate and sodium palmitate. Examples of the antistatic agents include N,N-bis (hydroxyethyl)alkylamine, alkylamine, alkylallylsulfonate and alkylsulfonate. Examples of the fire retardants include hexabromocyclododecane, tris-(2,3-dichloropropyl)phosphate and penbromophenylallylether. Examples of the nucleation agents include polyethylene terephthalate, poly-tran-scyclohexanedimethanolterephthalate and amide palmitate. Examples of the antibacterial agents include silver inorganic antibacterial agents, zinc inorganic matter antibacterial agents, and organic antibacterial agents such as hinokithiol. Examples of the fungicides include inorganic/organic hybrid fungicides. Examples of the deodorizers include an inorganic deodorizer (Kesumon (trade name)) of Toagosei Co., Ltd.

Second, the matte film using the inorganic filler and/or the fine particle polymer as the filler will specifically be described.

The matte film or sheet of the present invention is mainly composed of a blend containing the biodegradable resin (A) ultimately decomposed by microorganisms, and the inorganic filler (E) and/or the fine particle polymer (F). In order to obtain the matte film or sheet of the present invention, referring to the weight proportion (when the total of the biodegradable resin (A), inorganic filler (E) and fine particle polymer (F) is 100% by weight) of the components of the blend of the biodegradable resin (A) containing the biodegradable polyester (a1) having a glass transition temperature Tg of 10° C. or lower, and inorganic filler (E) and/or fine particle polymer (F), the weight proportion of the biodegradable resin (A) is preferably 60 to 99% by weight; and the weight proportion of the inorganic filler (E) and/or fine particle polymer (F) is 1 to 40% by weight. More preferably, the weight proportion of the biodegradable resin (A) is 65 to 97% by weight, and the weight proportion of the inorganic filler (E) and/or fine particle polymer (F) is 3 to 35% by weight. Still more preferably, the weight proportion of the biodegradable resin (A) is 70 to 95% by weight, and the weight proportion of the inorganic filler (E) and/or fine particle polymer (F) is 5 to 30% by weight. Particularly preferably, the weight proportion of the biodegradable resin (A) is 75 to 93% by weight, and the weight proportion of the inorganic filler (E) and/or fine particle polymer (F) is 7 to 25% by weight.

When the proportion of the biodegradable resin (A) is less than 60% by weight and the proportion of the inorganic filler (E) and/or fine particle polymer (F) exceeds 40% by weight, the obtained film or sheet tends to have inferior mechanical properties to become brittle and reduce the film forming stability. Also, the flexibility of the film or sheet tends to be reduced, and the reduction tends to worsen irregularities transfer property and adhesiveness with a substrate without following irregularities in producing lamination products having the irregularities such as emboss processing. When the proportion of the biodegradable resin (A) exceeds 99% by weight, the proportion of the inorganic filler (E) and/or fine particle polymer (F) is less than 1% by weight, and the matting property is inferior. It is difficult to obtain a film having a surface gloss (Gloss: 45 degree) as measured in accordance with ASTM-D2457-70 of 60% or lower and having good matting property.

The biodegradable resin (A) of (a1) and (a2) used for the matte film or sheet of the present invention having antifouling characteristic and the biodegradable resin (A) other than (a1) and (a2) are a polymer in which biodegradable degree measured in accordance with at least one of biodegradable tests (: OECD 301 C, JIS K6950 (2000), JIS K6951 (2000), or JIS K6953 (2000)) specified by the Identification and Labeling Committee of the Biodegradable Plastic Society is 60% or higher within a period described in each test method. They are as described above.

Preferably, the biodegradable resin (A) contains 10 to 90% by weight of the polylactic acid resin based on the total amount of the biodegradable resin (A) for applying moderate surface hardness to the obtained film or sheet and enhancing antifouling characteristic. The polylactic acid resin used herein is as described above.

The inorganic fillers (E) used in the present invention are described on pages 30 and 31 of "Resin/Filler Hneading Technology" (publisher: Kazuhiro Takausu, the first print published date: Mar. 31, 2000) published by TECHNICAL INFORMATION INSTITUTE CO., LTD., and are as described above.

The fine particle polymer (F) used in the present invention is composed of a synthetic polymer, a natural polymer, encapsulated powder and composite powder or the like, as described in pages 257 to 259 of "Frontier Technology of Ultrafine Particle Polymer" (supervising editor: Soichi Muroi, publisher: Tsuruo Sakai, the first print published date: Apr. 26, 1991) published by CMC CO., LTD., and is as described above.

The matte film or sheet of the present invention is required to have at least one surface having a surface gloss (Gloss: 45 degree) as measured in accordance with a gloss meter (ASTM-D2457-70) of 60% or lower. Preferably, the matte film or sheet has a surface gloss (Gloss: 45 degree) of 30% or lower, more preferably 20% or lower, and particularly preferably 10% or lower. The film or sheet having a gloss exceeding 60% has inferior matting property.

As the raw material resins used for the matte film or sheet of the present invention, the trim waste or the like generated in forming the resin film can be used by reprocessing the trim waste or the like in addition to the above virgin materials.

Additives usually used in the technical field, if required, for example, a plasticizer, an antioxidant, a heat stabilizer, a hydrolysis depressant, a ultraviolet absorber, a lubricant, an antistatic agent, a fire retardant, a nucleation agent, a crosslinking agent, a colorant, an antibacterial agent, and an fungicide can be incorporated in the matte film or sheet of the present invention in the range where the requirement and the characteristic of the present invention are not impaired. They are as described above.

The plasticizer can be selected and used from those commonly used in this field. Preferred are those which do not bleed out and are harmless and safe substance for a human body. Examples of the plasticizers include phthalate esters, aliphatic dibasic acid esters, hydroxy-polycarboxylic acid esters, polyvalentalcohol esters, fatty acid esters, phosphate esters, epoxy plasticizers, and aliphatic polyvalentalcohols. More preferable plasticizers are aliphatic dibasic acid esters, hydroxy-polycarboxylic acid esters, polyvalentalcohol esters, fatty acid esters, and epoxy plasticizers. Still more preferable plasticizers are esters synthesized from two or more selected from the group consisting of aliphatic carboxylic acids, aliphatic hydroxycarboxylic acids and aliphatic alcohols. Particularly preferable plasticizers are esters synthesized from two or more selected from the group consisting of aliphatic carboxylic acids having carbon numbers of 20 or lower, aliphatic hydroxycarboxylic acids having carbon numbers of 20 or lower, and aliphatic alcohols having carbon numbers of 20 or lower.

Next, a method for producing the matte film or sheet of the present invention having antifouling characteristic will be described.

A mixing method or a mixed device for the biodegradable resin (A), the starch (B) and/or the modified starch (C), the plasticizer (D), and the inorganic filler (E) and/or the fine particle polymer (F) or the like are not particularly limited. For example, the method in which materials are respectively fed in the same uniaxial or biaxial extrusion kneader, melt-kneaded and extruded from a base (die lip) to form a film or sheet directly, or to form strands to obtain pellets which are extruded again to produce a film or sheet. The biaxial extrusion kneader is preferably used in order to improve the dispersibility of the starch (B), modified starch (C) and inorganic filler (E) and/or fine particle polymer (F) or the like as powder. As a method for uniformly mixing the starch (B) and/or the modified starch (C), and the biodegradable resin (A), a method (mixing the starch, the biodegradable resin (for example, Eco Flex), glycerine and a little water, and operating while melt-kneading them in the co-rotating twin-screw extruder and purging free gas) described in JP-A-2002-518538 can be used to mix and pelletize the components.

Although the melt extrusion temperature is suitably selected in consideration of the melting point of the biodegradable resin (A), and the mixing ratio of the starch (B) and/or modified starch (C), plasticizer (D), and inorganic filler (E) and/or fine particle polymer (F), the temperature range of 100 to 250° C. is preferred. If the film or sheet is only made opaque, only mixing a non-compatible resin, inorganic particles and organic particles with a matrix resin is required. However, it is important to form irregularities on the surface of the film or sheet in order to obtain matting property. When the biodegradable resin (A) as the matrix is drawn and thinly formed in a process where the biodegradable resin (A) containing the starch (B) and/or the modified starch (C), the plasticizer (D), and the inorganic filler (E) and/or the fine particle polymer (F) or the like is gotten from a die and is melt-drawn, it is required to prevent the flow modification of the starch (B) and/or modified starch (C), and inorganic filler (E) and/or fine particle polymer (F) or the like which have larger viscosity than that of the matrix. Preferably, the matting property is exhibited by forming irregularities on the surface of the film or sheet in order to hold granular and bar-shaped forms having a diameter of 0.1 μm or higher and a tabular form having a long side of 0.1 μm or higher. Therefore, preferably, the melt extrusion temperature is the lowest temperature in the range where the resin can be extruded and the film can be formed for obtaining the film having excellent matting property so that the starch (B) and/or the modified starch (C), and the inorganic filler (E) and/or the fine particle polymer (F) or the like have sufficiently larger viscosity than that of the biodegradable resin (A) as the matrix. More preferable temperature range is 130 to 210° C., still more preferably 150 to 200° C., and particularly preferably 160 to 190° C.

Examples of the methods for forming the matte film or sheet of the present invention which has antifouling characteristic, include a method for casting to a cooling roll from a T die; and conventional film forming methods such as an inflation method or a tenter method wherein non-drawing, uniaxial drawing or simultaneous or subsequent biaxial drawing is conducted. Specifically, a film or sheet is obtained by (1) a melt drawing method wherein a resin extruded in the form of a tube or sheet is melt-drawn in the molten state according to the inflation method or cast method; (2) a cold drawing method wherein a resin extruded in the form of a tube or sheet is quenched from the molten state to solidify in the state close to the amorphous state, heated to a temperature between a glass transition temperature and the melting point and subjected to drawing according to the inflation method or the roll tenter method; or a method for subjecting to heat treatment with the film or sheet held for suppressing the heat shrinkability of the film or sheet after the melt drawing or the cold drawing, to obtain a film or sheet.

As described above, the process in which the biodegradable resin (A) as the matrix is drawn in the molten state is important to obtain the matting film. In a method in which the biodegradable resin (A) is casted in the state near the molten state by a smooth cooling roll and a method in which the resin is rolled through 2 or more smooth rolls, the formation of irregularities on the surface of the film or sheet is easily disturbed by the smooth rolls in granular, rod-like or tabular disperse phases (domains) of the starch (B) and/or modified starch (C), and the inorganic filler (E) and/or fine particle polymer (F) or the like which contribute to the development of the matting property in the matrix composed of the biodegradable resin (A), and the matting property tends to be easily reduced. As compared with these methods, in a method for extruding the resin in the form of a tube and obtaining the film or sheet by an inflation method, the biodegradable resin (A) as the matrix is not brought into contact with the smooth roll in the state near the molten state. Since the starch (B), modified starch (C), and the inorganic filler (E) and/or fine particle polymer (F) or the like which contribute to the development of the matting property hardly disturb the formation of irregularities on the surface of the film or sheet, preferably, the film or good sheet having good matting property is easily obtained. The film or sheet obtained by the melt-drawing method has lower orientation degree of the polymers chain of the biodegradable resin (A) as the matrix than that of the film or sheet obtained by the cold-drawing method. Therefore, when the obtained matte film or sheet is laminated on the other materials, the matte film or sheet is easily drawn; the matte film or sheet is easily drawn according to the surface shapes of the other materials; and the matte film or sheet easily follow the irregularity shape such as emboss. Thereby, preferably, the matte film or sheet has excellent processability.

It is preferable to melt-drawn or cold-draw the film or sheet in at least one axial direction so that the thickness of the last film or sheet is in the range of $1/500$ to $1/40$ based on an extrusion base (die lip) interval in spite of the drawing method as the drawing ratio of the film or sheet. In obtaining a noncontractile film or sheet as heat treatment processing of the film or sheet, preferably, the heat treatment temperature is in the range of about 60° C. to 160° C., and the heat treatment time is in the range of 2 to 10 seconds. When they are less than the range, the shrinkage ratio of the obtained film is high, and thereby the noncontractile film is not easily formed. When they exceed the range, the film may be melted and broken during the heat treatment.

The thickness of the matte film or sheet of the present invention which has antifouling characteristic is preferably 5 to 500 μm, more preferably 7 to 250 μm, and still more preferably 7 to 100 μm. When the film is heat-laminated and used on the other material having the surface irregularities of emboss or the like, and surface irregularities shape such as emboss is applied after the heat lamination, the thickness of the film is preferably as thin as possible in the range where the strength capable of be treated is held and in the range where the dirt prevention characteristic and the function of the surface matte film are maintained so that the irregularity shape can be reproduced as faithfully as possible. The film of 20 μm or lower is more preferable, and the film of 15 μm or lower is still more preferable.

When particularly obtaining a thin film of 20 μm or lower as a method for producing the matte film or sheet of the present invention which has antifouling characteristic, the target film and the non-adhesive resin are co-extruded by a multilayer die, and then the target film can be obtained by removing the resin layer of the non-adhesive. Since the producing method can improve film forming stability using the non-adhesive resin, the producing method is preferable.

Generally, the resins of which the value (SP value) of the soluble parameter is near have good compatibility, and tend to be easily mixed in blending them. When the resins are co-extruded in producing the film, the contacted resin layers are easily adhered. Therefore, in selecting the non-adhesive resin, preferably, the resins in which the chemical structure (primary structure) and polarity of the resins of the resin layers contacted are different as much as possible are preferably selected. In that case, the difference of the values of the soluble parameter is also increased, and even when the resins are co-extruded in producing the film, the combination of the non-adhesive resin layers can be selected. As example, a lot of biodegradable resins mainly have an aliphatic polyester structure and have a group having comparatively large polarity such as a carbonyl group. Therefore, a nonpolar resin such as polyolefin tends to be hardly adhered to an aliphatic polyester resin, and is one of good non-adhesive resins. When the non-adhesive resin layer is peeled off after producing the film as the standard of the non-adhesiveness, the non-adhesiveness in which the target film or sheet is peeled off without deforming so that the target film or sheet applies a bad influence practically is preferable. As long as the non-adhesive resin for the matte film or sheet of the present invention has non-adhesiveness and excellent film forming stability, the resin is not particularly limited. However, polyolefin resins such as polyethylene and polypropylene is preferable.

The matte film or sheet of the present invention which has antifouling characteristic includes a multilayer film or sheet in which the matte film or sheet of the present invention which has antifouling characteristic is laminated so that a surface gloss (Gloss: 45 degree) of at least one outer surface is 60% or lower in addition to the single layer film or sheet. Particularly, in the multilayer film or sheet, preferred is a multilayer film or sheet having a layer composed of the matting property film or sheet of the present invention which has antifouling characteristic on at least one outer surface and a layer which improve physical properties, such as a layer which improves processability such as film forming stability of the film or sheet, a layer which applies flexibility, or a layer which improves the adhesiveness with the other substrate as other layers. More preferred is a multilayer film or sheet having a layer having the matting property film or sheet of the present invention which has antifouling characteristic on at least one outer surface and a layer which improves physical properties, such as a layer, which improves processability such as the film forming stability, a layer which applies flexibility, or a layer which improves the adhesiveness with the other substrate as other layers is composed of the biodegradable resin.

In the multilayer film of the present invention, preferably, the multilayer matte film or sheet comprises at least two layers in which the single-layer matte film or sheet of the present invention which has antifouling characteristic is laminated so that a surface having a surface gloss of 60% or lower is one outer surface and a layer containing a resin containing 40% by weight or higher of the biodegradable polyester (a1) having a glass transition temperature Tg of 10° C. or lower is laminated on the other surface. That is because excellent adhesiveness to the substrate is shown even when the temperature of the other surface is lower in being laminated on the other material by heat. More preferred is the multilayer matte film or sheet which has a structure composed of at least two layers in which a layer composed of a resin which contains 50% by weight or higher of the biodegradable polyester (a1) having a glass transition temperature Tg of 10° C. or lower is laminated on the other surface and has antifouling characteristic. Still more preferred is a multilayer matte film or sheet which has a structure composed of at least two layers in which a layer composed of a resin which contains 60% by weight or higher of the biodegradable polyester (a1) having a glass transition temperature Tg of 10° C. or lower is laminated on the other surface and has antifouling characteristic. Particularly preferred is a multilayer matte film or sheet which has a structure composed of at least two layers in which a layer composed of a resin which contains 60% by weight or higher of the biodegradable polyester (a1) having a glass transition temperature Tg of 10° C. or lower is laminated on the other surface and has antifouling characteristic, and of which the biodegradable polyester (a1) is composed of a resin which is an aliphatic-aromatic polyester. It is because the adhesiveness to the surface of a wallpaper main part is excellent in using as a dirt prevention film for the wallpaper. Particularly, more preferably, the wallpaper is a vinyl chloride wallpaper.

Or the matting film or sheet of the present invention which has antifouling characteristic may be a single material or a composite material in which different kind of materials or the same kind of materials are laminated. Furthermore, the film can be also made hydrophilic by a corona treatment or the like for the purposes for printing, coating and lamination or the like. In that case, the surface tension is preferably in the range of 40 mN/m to 60 mN/m.

The use for using the film or sheet alone is a packaging material, an agricultural material such as a growing house and a mulch film which directly uses the film or sheet of the present invention for packaging in order to provide luxury appearance to a packed body. The use as a composite material prepared by laminating the film or sheet on the other materials includes use as a film for preventing the dirt of the wallpaper which is laminated on the surface of the wallpaper as the film for the dirt prevention of the wallpaper and does not impair the matting property of the wallpaper; the use for laminating the film or sheet on the surface of a screen which dislike stray light; the use for laminating the film or sheet on the surface of indoor decoration such as furniture, furniture furnishings and curtains to prevent the dirt and provide luxury appearance due to the matting property; the use for laminating the film or sheet on the surface of an article for everyday, school supplies, writing material, and notebook used in order to provide luxury appearance similar to leathers; the use for laminating the film or sheet on the surface of paper products (paper container and sliding-screen paper or the like) used in order to provide luxury appearance due to matting property and to apply waterproofing and oilproofing effects to paper; the use for laminating the film or sheet on the surface of a cloth product (a nonwoven fabric product is also included) such as a tablecloth to provide luxury appearance due to matting property and to provide waterproofing effect and antifouling characteristic; and the use for laminating the film or sheet on a light diffusing plate or transparent plate containing a diffusing agent to apply a light diffusing effect.

EXAMPLES

Hereinafter, the present invention will be specifically described based on Examples.

Evaluation methods used in Examples and Comparative Examples will be described below.

(1) Optical Purity (OP) of a Polylactic Acid Resin (Nature Works 4042D (Trade Name), Cargill Dow LLC) and Polylactic Acid Resin (Lacty 9030 (Trade Name), Shimadzu Corporation)

The optical purity (OP; unit: %) of a polylactic acid resin is calculated from the following equation based on a composition ratio of L-lactic acid and/or D-lactic acid monomer unit.

OP=|[L]−[D]|, wherein [L]+[D]=100; [L] is the weight ratio (%) of L-lactic acid; [D] is the weight ratio (%) of D-lactic acid.

The composition ratio of L-lactic acid and/or D-lactic acid monomer units composing polylactic acid was determined by the following measuring conditions. A hydrolyzed sample (liquid) was prepared by alkaline decomposition of a sample with 1N—NaOH, followed by neutralizing with 1N—HCl and adjusting the concentration with distilled water. The hydrolyzed sample was passed through a high performance liquid chromatography (HPLC: LC-10A-VP (trade name)) equipped with an optical isomer separation column (manufactured by Shimadzu Corporation). A weight ratio of L-lactic acid [L] (unit: %) in the polylactic acid polymers and a weight ratio of D-lactic acid [D] (unit: %) in the polylactic acid polymers were obtained from an area ratio of detected peaks (area was measured by a vertical line method) corresponding to L-lactic acid and D-lactic acid at 254 nm UV. The mean (rounded off) of three measurement values per polymer was taken as the measurement value of the composition ratio.

Column: "TSKgel-Enantio-L1" (trade name) [4.6 mm diameter×25 cm long] manufactured by Tosoh Corp.

Mobile phase: 1 mM-$CUSO_4$ solution

Concentration of sample solution: 25 pg/μL (concentration as a polylactic acid polymer)

Amount of sample liquid charged: 10 μL

Flow rate of solvent: 0.5 to 0.8 ml/min

Column temperature: 40° C.

(2) Weight Average Molecular Weight (Mw) of Polylactic Acid Resin Lacty 9030

Gel permeation chromatography (GPC: data processing part; GPC-8020, detector; RI-8020) manufactured by Tosoh Corp. was used. The weight-average molecular weight Mw was determined under the following measuring conditions, as dispersed weight average values of polymers except for those having a molecular weight of less than or equal to 500 in terms of polystyrene value based on the standard polystyrene. Three measurement values per polymer were arithmetically averaged (with a number of significant figures of 2) and the average was employed as the measurement value.

Column: connected column of "Shodex K-805" (trade name) and "Shodex K-801" (trade name) manufactured by Showa Denko K.K. [7.8 mm diameter×60 cm long]

Elute: chloroform

Concentration of sample solution: 0.2 wt/vol %

Amount of sample liquid charged: 200 μL

Flow rate of solvent: 1 ml/min

Column/detector temperature: 40° C.

(3) Melting Point Tm and Glass Transition Temperature Tg of Nature Works 4042D, Lacty 9030, Bionolle #3001 (Trade Name, Showa Highpolymer Co., Ltd.), Eco Flex (Trade Name, BASF), and Lunarle SE-P5000 (Trade Name, Noppon Shokubai Co., Ltd.), and Corn Pole CP-3 (Trade Name, Nihon Cornstarch Corporation)

According to JIS-K 7121, the melting point Tm and glass transition temperature Tg of a resin were measured. That is, about 10 mg of test sample was cut out from a sample film conditioned (by leaving to stand at 23° C. for 1 week) in the standard state (23° C., 65% RH) at two points each from the longitudinal direction (MD) and the width direction (TD). Then, the test sample was heated from the room temperature (23° C.) to 200° C. at 10° C./min at a nitrogen gas flow rate of 25 ml/min using differential scanning calorimeter (heat flow type DSC) DSC-7 (trade name) type manufactured by Perkin-Elmer Co., Ltd. (primary heating) and kept at 200° C. for 10 minutes to melt completely. After that, the molten test sample was cooled down to −100° C. at 30° C./min, kept at −100° C. for 2 minutes. The sample was then heated again (secondary heating) under the same conditions as the primary heating. Among the DSC curves drawn in the temperature increasing process, a top of melting (endothermic) peak of the primary heating was determined as melting point Tm (° C.) and a cross point (midpoint glass transition temperature) of step-wise changing part of a curve of the secondary heating and a line with equal distance in vertical axis direction from drawn lines of both base lines was determined as glass transition temperature Tg (unit: ° C.). Four measurement values per polymer were arithmetically averaged (rounded after the decimal point) and the average was employed as the measurement value.

(4) Mean Particle Diameter (μm) of Inorganic Filler (E) and Fine Particle Polymer (F)

Referring to the mean particle diameter of the inorganic filler (E) and fine particle polymer (F), a particle diameter at which the cumulative frequency from the small particle diameter was 50% was defined as the mean particle diameter using the laser diffraction/scattering particle size distribution measuring device LA-910 (trade name) by Horiba, Ltd.

(5) Thickness of all Layers and Thickness of Each of Layers of Film or Sheet (μm)

The thickness of all layers of the film was measured using a micrometer according to JIS-K-7130. Referring to the thickness of each of layers, the section of the multilayer film was observed and measured under a microscope.

(6) Surface Gloss (Gloss: 45 degree) (%)

A square film test piece with a size of 50 mm×50 mm was cut out from a sample film or sheet conditioned (by leaving to stand at 23° C. for 1 week) in the standard state (23° C., 65% RH). The surface gloss (Gloss: unit %) was measured at the standard condition using a gloss meter VGS-300A (trade name) manufactured by Nippon Denshoku Industries Co., Ltd. in accordance with ASTM-D2457-70. Six measurement values per each type of film or sheet were arithmetically averaged (with a number of significant figures of 2).

(7) Matting Property

The matting property was evaluated as follows in view of shine property of a packaging body in forming the packaging body using the film or sheet.
aa: the best matting degree and almost no shine
a: considerably suppressed shine and level of good matting property
b: shine suppressed in the middle and level of matting property in the middle
c: shine suppressed to some extent, and level of practicable minimum matting property
x: inferior matting property and reflected light looking shine (8) Film Forming Stability The stability in forming films was estimated according to the following standards.
aa: The films can be stably formed without having a problem at all.
a: Although the films are formed almost without problem, the films may be unstably formed.
b: Brittle portions may rarely occur in the films to cause the extraction of inner air in forming the films in the form of a tube.
c: Brittle portions sometimes occur in the films to cause the extraction of inner air in forming the films in the form of a tube.
x: The films are brittle, and are often broken in forming the films in the form of a tube to cause the extraction of inner air, and it is difficult to obtain the films having no defect continuously.

(9) Irregularities Transfer Property and Adhesiveness

A foaming sheet for wallpaper made of a polyvinyl chloride resin preheated at 180° C. and a sample film were adhered by pressure with a roll which has a smooth surface and is brought into contact with the back paper of the polyvinyl chloride resin wallpaper and a emboss roll of 30° C., which is brought into contact with the sample film. The irregularities transfer property of the emboss roll, and the adhesiveness of a ground (polyvinyl chloride resin foaming sheet) and sample film were estimated according to the following standards.
aaa: Most beautiful emboss processing can be conducted by the highest irregularities transfer property, and the adhesiveness with the ground is also most excellent.
aa: Beautiful emboss processing can be conducted by excellent irregularities transfer property, and the adhesiveness with the ground is also excellent.
a: The irregularities transfer property and the adhesiveness with the ground are also good and in a beautiful state.
b: Although either the irregularities transfer property or the adhesiveness with the ground is good, either is at the minimum level permissible as practical use.
c: Both the irregularities transfer property and the adhesiveness with the ground are at the minimum level capable of being permitted as practical use.
x: At least one of the irregularities transfer property and adhesiveness with the ground is in a state where a level permissible as practical use is not reached.

(10) Film Elongation

The film elongation was evaluated according to the following standards by measuring an elongation at break (%) in the longitudinal direction of the film (MD direction) according to JIS K7127.
aa: The elongation at break is 50% or higher, and when the film is pulled out from a roll-shaped film, the film is moderately elongated. In addition, when tension is applied to the film for removing wrinkles, the film is well elongated to remove the wrinkles. Also, the film endures processing at high speed, and has best processability.
a: The elongation at break is 20% or higher and less than 50%, and when the film is pulled out from a roll-shaped film, the film is moderately elongated. When tension is applied to the film for removing wrinkles, the wrinkles are removed and the film has good processability.
b: The elongation at break is 10% or higher and less than 20%, and when the film is pulled out from a roll-shaped film, the film is slightly elongated and endures the breaking. If weak tension is applied to the film for removing the wrinkles, the wrinkles are also removed without the film being damaged. Although the processability requires cautions, the film can be used.
c: The elongation at break is 5% or higher and less than 10%, and when the film is pulled out from a roll-shaped film, the film is easily broken. When tension is applied to the film for removing wrinkles, and weak tension is always applied while being controlled, the wrinkles are also removed without being damaged. Since the processability requires cautions, and the film is brittle, the film is in the state of the minimum level capable of enduring the practical use.

x: The elongation at break is less than 5%. When the film is pulled out from a roll-shaped film, and tension is applied to the film for removing wrinkles, the film is in a brittle state where it is broken and cannot be used.

(11) Hydrolysis Resistant Test

A sample film with a size of 100 mm×100 mm was immersed in hot water of 90° C., and the film was estimated according to the following standards from the physical properties of the film.

aa: Even after the film is immersed in hot water of 90° C. for six days or more, the film has sufficient strength and elongation.

a: Even after the film is immersed in hot water of 90° C. for two days or more, the film has sufficient strength and elongation. However, after the film was immersed for six days, the film lost strength and elongation, and became brittle.

b: After the film was immersed in hot water of 90° C. for two days or more, the film lost strength and elongation, and became brittle.

(12) Antifouling Characteristic Test

The dirt prevention function (contamination resistance) in laminating on the wallpaper was investigated. According to a method described in the homepage (http://wacoa. topica.ne. jp/wacoa/kabe_kinou. html) of wallcoverings association of Japan, contaminants (coffee, soy sauce, crayon, water felt pen) were respectively adhered on the film. After 24 hours, the films prepared by wiping off the coffee and the soy sauce using water, and the films prepared by wiping off the crayon and the water felt pen using a neutral detergent are visually judged. Portions in which dirt was wiped off is compared with the original film, and it was judged visually whether they are equivalent to which of the following five-step evaluations.

5 class: Dirt does not remain.
4 class: Dirt hardly remains.
3 class: Dirt remains a little.
2 class: Dirt remains considerably.
1 class: Dirt remains deeply.

Antifouling characteristic evaluation as the film was estimated according to the following standards.

aa: The number of the 4 class of the four contaminants is 2 or lower, and all the remainder is the 5 class. The film has the most excellent antifouling characteristic.

a: The number of the 4 class of the four contaminants is 3, and the remaining one is the 5 class. The film has excellent antifouling characteristic.

b: All the four contaminants are the 4 class. The film has approximately middle antifouling characteristic.

c: The number of the 3 class of the four contaminants is 1, and all the remainder is the 4 class or higher. The film has antifouling characteristic of usable minimum level.

x: The number of the 3 class of the four contaminants is 2 or higher. The film has inferior antifouling characteristic.

(13) Overall Evaluation

The overall evaluation was conducted according to the following standards from the evaluation results of five items of matting property, film forming stability, irregularities following-up property, adhesiveness, film elongation and antifouling characteristic.

AAA: The evaluation of the irregularities transfer property and adhesiveness is aaa; all the evaluations of the other four items are aa; and the film or sheet has best antifouling characteristic and matting property.

AA: All the evaluations of five items are aa, and the film or sheet has excellent matting property.

A: One item or higher of the evaluation of 5 items is a, and all the remainder are aaa or aa. The film or sheet has excellent antifouling characteristic and matting property.

B: One item or higher of evaluation of 5 items is b, and all the remainder are aaa, aa, or a. The film or sheet has good antifouling characteristic and matting property.

C: One item or higher of evaluation of 5 items is c, and all the remainder are aaa, aa, a, or b. The film or sheet has antifouling characteristic and matting property of the minimum level capable of enduring the practical use.

x: Among evaluations of 5 items, one item or higher is x. The film or sheet cannot endure the practical use as the film or sheet which has antifouling characteristic and matting property.

The biodegradable resin (A) used for the following Examples and Comparative Examples is a polymer shown in Tables 1, 2 and 6. That is, the biodegradable resin (A) is crystalline polylactic acid (Nature Works4042D (trade name)) manufactured by Cargill Dow LLC, polylactic acid (Lacty 9030 (trade name)) manufactured by Shimadzu Corporation, polybutylene succinate adipate (Bionolle #3001 (trade name)) manufactured by Showa Highpolymer Co., Ltd., biodegradable aliphatic-aromatic polyester (Eco Flex (trade name)) manufactured by BASF, starch biodegradable resin (Mater-Bi NF01U (trade name)) manufactured by NOVAMONT, and polyethylene succinate (Lunarle SE-P5000 (trade name)) manufactured by Nippon Shokubai Co., Ltd. All of these polymers are registered into the classification A (resin) of a positive list of the Biodegradable Plastic Society (2-26-9, Hatchobori, Chuo-ku, Tokyo, URL: http://www. bpsweb. net/). The polymers have been already confirmed that the biodegradability measured in accordance with at least one of biodegradable tests (OECD 301 C, JIS K6950 (2000), JIS K6951 (2000), or JIS K6953 (2000)) specified by the Identification and Labeling Committee of the Biodegradable Plastic Society shows 60% or higher within the period defined by each test method.

Also, as the starch (B), cornstarch manufactured by Nihon Cornstarch Corporation was used; as the modified starch (C), the esterified starch (Corn Pole CP-3 (trade name)) manufactured by Nihon Cornstarch Corporation; as the plasticizer (D), glycerine as the aliphatic polyvalentalcohol manufactured by Sakamoto Yakuhin Kogyo Co., Ltd.; and as the hydroxy-polycarboxylic acid ester, ATBC (acetyl tributyl citrate) manufactured by Nissei Chemical Industries, Ltd. Also, as the inorganic filler (E), talc (high filler #5000PJ (trade name)) manufactured by Matsumura Industry, calcium carbonate (Colocalso EX (trade name)) manufactured by Shiraishi Calcium Kaisya LTD., and silica (Siperunate FK310 (trade name)) manufactured by Degussa Japan were used. As the fine particle polymer (F), silicone resin particles (KMP-590 (trade name)) manufactured by Shin-Etsu Chemical Co., Ltd.; a non-adhesive resin (Suntec LD F-1920 (trade name)) manufactured by Asahi Kasei Chemicals Corporation (see Tables 1, 6); a hydrolysis depressant (carbodiimide (Carbozirite LA-1 (trade name))) manufactured by Nisshinbo Industries, Inc.; and a silver inorganic antibacterial agent (Nobaron AG1100 (trade name)) manufactured by Toagosei Co., Ltd. were used (see Table 2).

The composition of the starch biodegradable resin (Mater-Bi NF01U (trade name)) used in this Example and manufactured by NOVAMONT was analyzed as follows and determined.

That is, about 100 mg of the Mater-Bi NF0IU resin pellet sample was dissolved in chloroform, and the obtained solution was then filtered through a membrane filter (made of PTFE, the pore size: 0.5 μm, and diameter: 47 mm). The insoluble substance (filtered residue) was weighed, and was then analyzed by an infrared absorption-spectrum method to confirm that the insoluble substance was starch. The content was 32.5% by weight based on the whole pellet. Next, the soluble substance (filtrate) was concentrated, vacuum-dried, and weighed. As the result of the following NMR analysis, the polymer component was polybutylene terephthalate adipate, and the absorption of a small amount of glycerine was confirmed in addition to polybutylene terephthalate adipate. Also, it was turned out that the molar ratio of butane diol, terephthalic acid and adipic acid in the polymer was 2.0:1.0:1.0 from NMR spectrum. Next, referring to glycerine, a pellet sample was frozen and pulverized in liquid nitrogen, and about 200 mg of the pulverized sample was extracted by acetone of 50° C. The extracted liquid was subjected to TMS (Trimethylsilyl) reaction by BSTFA (N,O-Bis(Trimethylsilyl)trifluoroacetamide), and subjected to gas chromatography analysis. The gas chromatography analysis confirmed that the plasticizer was glycerine, and determined amount of the content of 6.0% by weight based on the whole pellet. These results clearly showed that the composition of the Mater-Bi NF01U resin pellet contained 61.5% by weight of polybutylene terephthalate adipate, 32.5% by weight of starch and 6.0% by weight of glycerine, and the Mater-Bi NF01U resin pellet was used.

Examples 1A to 17A and Comparative Examples 1A to 6A

In Examples 1A to 17A and Comparative Examples 1A to 6A, raw material pellets compounded were obtained as follows using the biodegradable resin (A), starch (B), modified starch (C) and plasticizer (D) of Table 1. That is, with reference to JP-A-2002-518538, 60 parts by weight of Eco Flex, 32 parts by weight of cornstarch, 6 parts by weight of glycerine, and 2 parts by weight of water were melt-kneaded, extruded and pelletized using a co-rotating twin-screw extruder while evacuating free gas. The pelletized material was then sufficiently dried to obtain an Eco Flex pellet containing cornstarch and glycerine. The glycerine content in this pellet was measured and it was confirmed that the composition of the pellet contained 61.5% by weight of Eco Flex, 32.6% by weight of cornstarch and 5.9% by weight of glycerine as shown in Table 2. This was used for Examples 1A to 6A, 11A to 13A, 15A to 17A and Comparative Examples 2A, 6A as an Eco Flex pellet 1 (starch/glycerine/Eco-MB1) containing starch and glycerine (see Tables 3, 4). In Example 10A, cornstarch was further added, and an Eco Flex pellet 2 (starch/glycerine/eco-MB2) containing starch and glycerine was obtained and used, in which the pellet composition contained 53.4% by weight of Eco Flex, 40.6% by weight of cornstarch and 6.0% by weight of glycerine (see Tables 2, 3).

50 parts by weight of Corn Pole CP-3 and 50 parts by weight of polylactic acid (Nature Works 4042D) were melt-kneaded, extruded and pelletized by the co-rotating twin-screw extruder. The pelletized material was then sufficiently dried, and used for Examples 4A to 6A, 17A, and Comparative Example 3A as polylactic acid pellet (modified starch/PLA-MB) containing 50% by weight of Corn Pole CP-3 (see Tables 2, 3, and 4). Similarly, 62 parts by weight of polylactic acid, 30 parts by weight of Corn Pole CP-3 and 8 parts by weight of Plasticizer ATBC were melt-kneaded, extruded and pelletized by the co-rotating twin-screw extruder. The pelletized material was then sufficiently dried, and used for Examples 7A to 9A and 14A as polylactic acid pellet 1 (modified starch/ATBC/PLA-MB1) containing modified starch and ATBC (see Tables 2 and 3). 60 parts by weight of polylactic acid and 40 parts by weight of silicone resin fine particle KMP-590 were melt-kneaded, extruded and pelletized by the same method. The pelletized material was then sufficiently dried, and used for Examples 7A to 9A as polylactic acid pellet (silicone/PLA-MB) containing KMP-590 (see Tables 2, 3).

In Comparative Example 1A, the raw material pellet was prepared and used by dry-blending the pellet of polylactic acid and Eco Flex to the composition of Table 4. In Comparative Example 2A, in the same manner as in the above description, there was used the modified starch composed of 37.7% by weight of polylactic acid, 47.2% by weight of Corn Pole CP-3 and 15.1% by weight of ATBC, the polylactic acid pellet 2 (modified starch/ATBC/PLA-MB2) containing ATBC, and the Eco Flex pellet 1 (starch/glycerine/eco MB1) containing the starch and the glycerine so as to have the composition ratio of Table 2. In Comparative Example 3A, the above polylactic acid pellet (modified starch/PLA-MB) containing Corn Pole CP-3 and a pellet of polylactic acid were dry-blended and used as a raw material pellet. In Comparative Example 4A, without using the plasticizer at all, Eco Flex, polylactic acid, cornstarch and Corn Pole CP-3 were melt-kneaded, extruded and pelletized in the composition of Table 4 by the co-rotating twin-screw extruder, and then sufficiently dried to obtain a raw material pellet.

In Comparative Example 5A, Eco Flex, polylactic acid, Corn Pole CP-3 and ATBC were melt-kneaded, extruded and pelletized in the composition of Table 4 in the same manner as in the above description by the co-rotating twin-screw extruder, and then sufficiently dried to obtain a raw material pellet. In Comparative Example 6A, the above Eco Flex pellet 1 (starch/glycerine/eco-MB1) containing starch and glycerine was used as it was.

Various raw material pellets obtained thus and the resin pellet of polylactic acid, Eco Flex and Bionolle were dry-blended so that the composition ratio of the biodegradable resin (A), starch (B) and/or modified starch (C), and fine particle polymer (F) is shown in Tables 3, 4, melted and extruded by a single screw extruder. A film was formed using a cylindrical single layer die. In forming the film, the glycerine as the plasticizer is diffused into the atmosphere from the film to decrease the residual amount in the film. Therefore, the glycerine was extracted from the film after forming the film; the amount thereof was measured; and the composition of the remaining resin components was determined by calculation. The content of the glycerine in the obtained film was measured by the above method.

In forming the film, there was used a cylindrical die having an outer die lip diameter of 110 mm, an inner die lip diameter of 108 mm and a lip clearance of 1.0 mm. While air of about 25° C. was sprayed to the melt resin extruded in the form of a tube from a cooling ring, the air was injected into the tube to form bubbles. The obtained film was introduced to a pinch roll, and the tube-shaped film was rewound as flat two films. Next, after the bubbles was stabilized, the resin extrusion speed, the air injection amount into the bubbles, and the film rewinding speed in the pinch roll were finely adjusted to obtain a film having a final thickness of 15 μm. However, since the obtained film was brittle in Comparative Example 4A, the film could not be formed so that the thickness of the film was reduced to 15 μm. In Comparative Example 5A, the surface of the obtained film was adhered by the bleeding out of the plasticizer to cause intense blocking, and a film for evaluation was not obtained.

The glycerine amount, composition, matting property, film forming stability, irregularities transfer property, adhesiveness, elongation, antifouling characteristic and overall evaluation of the films obtained in Examples 1A to 17A and Comparative Examples 1A to 3A, 6A were shown in Tables 3, 4.

Examples 18A to 24A and Comparative Example 7A

In Examples 18A to 21A, 23A, and Comparative Example 7A, the content of starch, polybutylene terephthalate adipate and glycerine was dry-blended and used for a first layer (the outermost layer of a tube-shaped film) so that the resin composition ratio of known starch biodegradable resin Mater-Bi NF01U manufactured by NOVAMONT, polylactic acid and Eco Flex is shown in Table 5 in the above analysis. In Example 22A, the Eco Flex pellet 2 (starch/glycerine/eco-MB2) containing starch and glycerine, and polylactic acid were dry-blended and used in the resin composition ratio shown in Table 5. In Example 24A, the modified starch, polylactic acid pellet 1 (modified starch/ATBC/PLA-MB1) containing ATBC, polylactic acid, and Bionolle were dry-blended and used. However, since the glycerine is diffused and decreased in the atmosphere during the film formation, first, the glycerine content in the obtained film was measured by the above analysis method, and the content of the other components was determined by calculation from the charge amount. In addition, in all of Examples 18A to 24A and Comparative Example 7A, 0.2 parts by weight of carbodiimide (Carbozirite LA-1 (trade name)) manufactured by Nisshinbo Industries, Inc. were added into 100 parts by weight of the total of the biodegradable resin (A), starch (B) and/or modified starch (C), and plasticizer (D). 0.2 parts by weight of a silver inorganic antibacterial agent (Nobaron AG1100 (trade name)) manufactured by Toagosei Co., Ltd. was added into 100 parts by weight of the total of the biodegradable resin (A), starch (B) and/or modified starch (C), and plasticizer (D). As shown in Table 2, a polylactic acid pellet (CDI/PLA-MB) containing 10% by weight of carbozirite LA-1 was used as the carbodiimide, and a polylactic acid pellet (antibacterial agent/PLA-MB) containing 4% by weight of Nobaron AG1100 was used as the antibacterial agent.

In Example 18A, an Eco Flex pellet (talc/Eco-MB) containing 40% by weight of talc was produced as shown in Table 2 using talc (High Filler #5000PT (trade name)) manufactured by Matsumura Industry. As shown in Table 5, 4 parts by weight of talc were added into 100 parts by weight of the total of the biodegradable resin (A), starch (B) and/or modified starch (C), and plasticizer (D). A polylactic acid pellet (CDI/PLA-MB) containing Eco Flex, polylactic acid, and carbozirite LA-1 10% by weight was dry-blended and used for a second layer (middle layer) in the composition shown in Table 5. 0.5 parts by weight of the carbozirite LA-1 were added into 100 parts by weight the total of resins using for the second layer. Low density polyethylene (Suntec LD F-1920) as the non-adhesive resin for the second layer resin in Examples 18A to 24A was used for a third layer (the innermost layer of a tube-shaped film).

In Examples 18A to 24A, the resin was extruded from a cylindrical die having an outer die lip diameter of 110 mm, an inner die lip diameter of 108 mm, and a lip clearance of 1.0 mm and composed of three layers to form multilayer films having the thickness of each layer shown in Table 5. In Examples 18A to 24A, after completing the formation of the film, a low density polyethylene layer as a non-adhesive resin layer was peeled off from the other two layers to obtain the target film, and the physical properties thereof were evaluated. In Comparative Example 7A, in order to directly obtain a film having the same composition, layer structure and thickness as those of the film after peeling off the non-adhesive resin layer of the film of Example 19A, the following work was conducted. That is, in the same manner as in Example 19A, materials for a first layer and a second layer were prepared in the composition shown in Table 5, and extruded from a cylindrical die having an outer die lip diameter of 110 mm, an inner die lip diameter of 108 mm and a lip clearance of 1.0 mm and composed of two layers to try to obtain a film having thickness of 10 μm having two kinds of material and two layers. However, the continued film could not be obtained by the reduction of the film forming stability, and the physical properties of the film obtained in fragments were evaluated.

Table 5 showed the results of the measured values of the glycerine contents of the films thus obtained, composition of each layer, layer structure and thickness of each layer obtained by calculating using the values, and matting property, film forming stability, irregularities transfer property and adhesiveness, elongation, antifouling characteristic, hydrolysis resistant and overall evaluation of the obtained films. However, the value of the gloss (%) is the surface gloss of the first layer side, that is, a value obtained by measuring the gloss (%), and the matting property and antifouling characteristic were also evaluated at the first layer side. The second layer side was adhered on a polyvinyl chloride resin wallpaper and thermally compressed so that the first layer side came out to the outer surface, and the irregularities transfer property and adhesiveness were estimated.

Examples 1B to 16B and Comparative Examples 1B to 3B

In Examples 1B to 16B and Comparative Examples 1B to 3B, raw material pellets compounded were obtained as follows using the biodegradable resin (A), inorganic filler (E) and fine particle polymer (F) of Table 6. That is, the biodegradable resin (A), inorganic filler (E) and fine particle polymer (F) were melt-blended in the composition shown in Table 7 using the co-rotating twin-screw extruder to obtain a biodegradable resin compound pellet.

Next, the biodegradable resin compound pellet thus obtained was melt-extruded by the single screw extruder to form a film using a cylindrical single layer die.

In extracting, there was used a cylindrical die having an outer die lip diameter of 110 mm, an inner die lip diameter of 108 mm and a lip clearance of 1.0 mm. While air of about 25° C. was sprayed to the melt resin extruded in the form of a tube from a cooling ring, the air was injected into the tube to form bubbles. The obtained film was introduced to a pinch roll, and the tube-shaped film was rewound as flat two films. Next, after the bubbles was stabilized, the resin extrusion speed, the air injection amount into the bubbles, and the film rewinding speed in the pinch roll were finely adjusted to obtain a film having a final thickness of 15 μm.

The physical evaluation results of the films obtained in Examples 1B to 16B and Comparative Examples 1B to 3B were shown in Table 7. The results of antifouling characteristic tests of the films obtained in Examples 1B to 16B were also shown in Table 7.

Examples 17B to 24B and Comparative Example 4B

In Examples 17B to 24B, a biodegradable resin compound pellet obtained by melt-blending using the co-rotating twin-screw extruder in the same manner as in Examples 1B to 16B in the composition shown in Table 8 was used for a first layer (the outermost layer of a tube-shaped film). However, in the Examples 17B, 18B, 21B to 24B, 2 parts by weight of carbodiimide (Carbozirite LA-1 (trade name)) by Nisshinbo Industries, Inc. were added into 100 parts by weight of the total of the biodegradable resin (A), inorganic filler (E) and/or fine particle polymer (F). In Examples 21B, 22B, 24B, the esterified starch (Corn Pole CP-3 (trade name)) manufactured by Nihon Cornstarch Corporation as the modified starch (C) of only the amount shown in Table 8 was added to produce and use biodegradable resin compound pellets. Eco Flex and lacty were dry-blended and used for a second layer (middle layer) in the composition shown in Table 8. Furthermore, 0.5 parts by weight of carbodiimide (Carbozirite LA-1 (trade name)) manufactured by Nisshinbo Industries, Inc. were added into 100 parts by weight of the total of the biodegradable resin (A). In Examples 17B to 24B, low density polyethylene (Suntec LD F-1920) used as the non-adhesive resin for the second layer resin was used for a third layer (the innermost layer of the tube-shaped film).

The resin was extruded from a cylindrical die having an outer die lip diameter of 110 mm, an inner die lip diameter of 108 mm, and a lip clearance of 1.0 mm and composed of three layers to produce multilayer films having the thickness of each layer shown in Table 8. In Examples 17B to 24A, after completing the formation of the film, a low density polyethylene layer as a non-adhesive resin layer was peeled off from the other two layers to obtain the target film, and the physical properties thereof were evaluated. In Comparative Example 4B, in order to directly obtain a film having the same composition, layer structure and thickness as those of the film after peeling off the non-adhesive resin layer of the film of Example 19B, the following work was conducted. That is, in the same manner as in Examples 17B to 24B, materials for a first layer and a second layer were prepared in the composition shown in Table 8, and extruded from a cylindrical die having an outer die lip diameter of 110 mm, an inner die lip diameter of 108 mm and a lip clearance of 1.0 mm and composed of two layers to try to obtain a film of 10 μm having two kinds and two layers. However, the continued film could not be obtained by the reduction of the film forming stability, and the physical properties of the film obtained in fragments were evaluated.

The physical evaluation results of the films thus obtained were shown in Table 8. However, the value of the gloss (%) was the surface gloss of the first layer side, that is, a value obtained by measuring the gloss (%), and the matting property was also evaluated at the first layer side. The second layer side was adhered on a polyvinyl chloride resin wallpaper and thermally compressed so that the first layer side came out to the outer surface, and the irregularities transfer property and adhesiveness were estimated. The results of antifouling characteristic tests of the films obtained in Examples 17B to 24B were also shown in Table 8. However, in Examples 17B to 24B, antifouling characteristic tests were conducted using the surface of the first layer side. These results show that the film of the present invention has excellent antifouling characteristic.

TABLE 1

| | D body content | optical purity | Tg | Tm | note |
|---|---|---|---|---|---|
| biodegradable resin (A) | | | | | |
| (a1) | | | | | |
| Eco Flex (biodegradable aliphatic-aromatic polyester) | | | −30° C. | 110° C. | product manufactured by BASF |
| Bionolle #3001 (polybutylene succinate adipate) | | | −45° C. | 95° C. | product by manufactured by Showa highpolymer Co., Ltd. |
| (a2) | | | | | |
| Nature Works 4042D (crystalline polylactic acid) | 4.2% | 92% | 58° C. | 159° C. | product manufactured by Cargill Dow LLC |
| starch (B) | | | | | |
| cornstarch | | | | | product manufactured by Nihon Cornstarch Corporation |
| modified starch (C) | | | | | |
| Corn Pole CP-3 (esterified starch) | | | 120-137° C. | | product manufactured by Nihon Cornstarch Corporation |
| plasticizer (D) | | | | | |
| glycerine | | | | | product manufactured by Sakamoto Yakuhin Kogyo Co., Ltd. |
| ATBC (acetyl tributyl citrate) | | | | | product manufactured by Nissei Chemical Industries, Ltd. |

| | mean particle diameter | whiteness degree | note |
|---|---|---|---|
| inorganic filler (E) | | | |
| High Filler #5000PJ (talc) | 1.5 μm | >92.0 | product manufactured by Matsumura Industrial Co., Ltd. |
| fine particle polymer (F) | | | |
| KMP-590 (silicone resin) | 1.5 μm | | product manufactured by Shin-Etsu Chemical Co., Ltd. |

TABLE 1-continued non-adhesive resin

Suntec LD F-1920  
(low density polyethylene)  
product manufactured by Asahi Kasei Chemicals Corporation

TABLE 2 material composition  
composition of raw material pellet (% by weight)

| raw material pellet name | (a1) polybutylene terephthalate adipate | Eco Flex | (a2) polylactic acid Nature Works 4042D | (B) starch | starch, cornstarch | (C) modified starch, Corn Pole CP-3 | (D) glycerine | ATBC |
|---|---|---|---|---|---|---|---|---|
| mater-Bi NF01U | 61.5 | | | 32.5 | | | 6.0 | |
| starch/glycerine/Eco-MB1 | | 61.5 | | | 32.6 | | 5.9 | |
| starch/glycerine/Eco-MB2 | | 53.4 | | | 40.6 | | 6.0 | |
| modified starch/ATBC/PLA-MB1 | | | 62 | | | 30 | | 8 |
| modified starch/ATBC/PLA-MB2 | | | 37.7 | | | 47.2 | | 15.1 |
| modified starch/PLA-MB | | | 50 | | | 50 | | |
| silicone/PLA-MB | | | 60 | | | | | |
| talc/Eco-MB | | 60 | | | | | | |
| CDI/PLA-MB | | | 90 | | | | | |
| antibacterial agent/PLA-MB | | | 96 | | | | | | material composition  
composition of raw material pellet (% by weight)

| raw material pellet name | (E) talc, high filler #500DPJ | (F) silicone KMP-590 | carbodiimide Carbozirite LA-1 | antibacterial agent Nobaron AG1100 | total |
|---|---|---|---|---|---|
| mater-Bi NF01U | | | | | 100 |
| starch/glycerine/Eco-MB1 | | | | | 100 |
| starch/glycerine/Eco-MB2 | | | | | 100 |
| modified starch/ATBC/PLA-MB1 | | | | | 100 |
| modified starch/ATBC/PLA-MB2 | | | | | 100 |
| modified starch/PLA-MB | | | | | 100 |
| silicone/PLA-MB | | 40 | | | 100 |
| talc/Eco-MB | 40 | | | | 100 |
| CDI/PLA-MB | | | 10 | | 100 |
| antibacterial agent/PLA-MB | | | | 4 | 100 |

TABLE 3

| | Examples | | | | | | | | | |
|---|---|---|---|---|---|---|---|---|---|---|
| | 1A | 2A | 3A | 4A | 5A | 6A | 7A | 8A | 9A | 10A |
| composition of raw materials (part by weight) | | | | | | | | | | |
| Nature Works 4042D (Polylactic acid) | 61 | 48 | 42 | 46 | 42 | 32 | 18.5 | 10.5 | 4.5 | 45.9 |
| Eco Flex (aliphatic-aromatic) | 5 | 5 | 5 | 10 | 5 | 5 | 24 | 32 | 42 | |
| Bionolle (aliphatic) | | | | | | | | | | |
| starch/glycerine/Eco-MB1 | 35.2 | 48.6 | 54.8 | 24.8 | 44.5 | 54.8 | | | | |
| starch/glycerine/Eco-MB2 | | | | | | | | | | 56 |
| modified starch/ATBC/PLA-MB1 | | | | | | | 50 | 50 | 43 | |
| modified starch/ATBC/PLA-MB2 | | | | | | | | | | |
| modified starch/PLA-MB | | | | 20 | 10 | 10 | | | | |
| silicone/PLA-MB | | | | | | | 12.5 | 12.5 | 17.5 | |
| total of raw materials (part by weight) | 101.2 | 101.6 | 101.8 | 100.8 | 101.5 | 101.8 | 105 | 105 | 107 | 101.9 |

TABLE 3-continued

| component compositions of film (% by weight) | | | | | | | | | | | |
|---|---|---|---|---|---|---|---|---|---|---|---|
| (A) | (a1) | Eco Flex (aliphatic-aromatic) | 26.6 | 34.9 | 38.7 | 25.3 | 32.4 | 38.7 | 24.0 | 32.0 | 42.0 | 29.9 |
| | | Bionolle (aliphatic) | 0 | 0 | 0 | 0 | 0 | 0 | 0 | 0 | 0 | 0 |
| | | Total of (a-1) | 26.6 | 34.9 | 38.7 | 25.3 | 32.4 | 38.7 | 24.0 | 32.0 | 42.0 | 29.9 |
| | (a2) | Nature Works 4042D (polylactic acid) | 61.0 | 48.0 | 42.0 | 56.0 | 47.0 | 37.0 | 57.0 | 49.0 | 41.7 | 45.9 |
| | | total of (A) | 87.6 | 82.9 | 80.7 | 81.3 | 79.4 | 75.7 | 81.0 | 81.0 | 83.7 | 75.8 |
| (B) | | cornstarch (starch) | 11.5 | 15.8 | 17.9 | 8.1 | 14.5 | 17.9 | 0 | 0 | 0 | 22.7 |
| (C) | | Corn Pole CP-3 (modified starch) | 0 | 0 | 0 | 10.0 | 5.0 | 5.0 | 15.0 | 15.0 | 12.9 | 0 |
| (D) | | glycerine | 0.9 | 1.3 | 1.4 | 0.6 | 1.1 | 1.4 | 0 | 0 | 0 | 1.5 |
| | | ATBC | 0 | 0 | 0 | 0 | 0 | 0 | 4.0 | 4.0 | 3.4 | 0 |
| total of (B) and (C) | | | 11.5 | 15.8 | 17.9 | 18.1 | 19.5 | 22.9 | 15.0 | 15.0 | 12.9 | 22.7 |
| total of (A), (B), (C) and (D) | | | 100 | 100 | 100 | 100 | 100 | 100 | 100 | 100 | 100 | 100 |
| | | (a1)/(A) (% by weight) | 30 | 42 | 48 | 31 | 41 | 51 | 30 | 40 | 50 | 39 |
| | | (aliphatic-aromatic)/(A) (% by weight) | 30 | 42 | 48 | 31 | 41 | 51 | 30 | 40 | 50 | 39 |
| | | (a2)/(A) (% by weight) | 70 | 58 | 52 | 69 | 59 | 49 | 70 | 60 | 50 | 61 |
| (F) | | KMP-590 (silicone resin) | 0 | 0 | 0 | 0 | 0 | 0 | 5.0 | 5.0 | 7.0 | 0 |
| film physical properties | | | | | | | | | | | | |
| matting property | | gloss (%) | 22 | 13 | 10 | 8 | 5 | 5 | 9 | 7 | 6 | 5 |
| | | matting property evaluation | b | a | aa | aa | aa | aa | aa | aa | aa | aa |
| film forming stability | | | aa | aa | aa | aa | aa | aa | aa | aa | aa | aa |
| irregularities transfer property and adhesiveness | | | aa | aa | aa | aa | aa | aa | aa | aa | aa | aa |
| elongation | | elongation at break (%) | 130 | 150 | 170 | 140 | 140 | 130 | 10 | 15 | 30 | 100 |
| | | elongation evaluation | aa | aa | aa | aa | aa | aa | b | b | a | aa |
| antifouling characteristic | | coffee | 5 class | 5 class | 5 class | 4 class | 5 class | 5 class | 5 class | 5 class | 5 class | 5 class |
| | | crayon | 4 class | 4 class | 4 class | 5 class | 4 class | 4 class | 4 class | 4 class | 4 class | 4 class |
| | | soy sauce | 5 class | 5 class | 5 class | 5 class | 5 class | 5 class | 5 class | 5 class | 5 class | 5 class |
| | | paint-stick | 5 class | 5 class | 5 class | 5 class | 5 class | 5 class | 5 class | 5 class | 5 class | 5 class |
| | | antifouling characteristic evaluation | aa | aa | aa | aa | aa | aa | aa | aa | aa | aa |
| overall evaluation | | | B | A | AA | AA | AA | AA | B | B | A | AA |

| | | | Examples | | | | | | |
|---|---|---|---|---|---|---|---|---|---|
| | | | 11A | 12A | 13A | 14A | 15A | 16A | 17A |
| composition of raw materials (part by weight) | | | | | | | | | |
| Nature Works 4042D (Polylactic acid) | | | 6 | 15 | 30 | 37.5 | 59.8 | 71.9 | 13.8 |
| Eco Flex (aliphatic-aromatic) | | | | | | | 25.7 | | |
| Bionolle (aliphatic) | | | | | | 12.5 | | | |
| starch/glycerine/Eco-MB1 | | | 97.6 | 88.1 | 72.5 | | 15 | 29 | 76.8 |
| starch/glycerine/Eco-MB2 | | | | | | | | | |
| modified starch/ATBC/PLA-MB1 | | | | | | 50 | | | |
| modified starch/ATBC/PLA-MB2 | | | | | | | | | |
| modified starch/PLA-MB | | | | | | | | | 12 |
| silicone/PLA-MB | | | | | | | | | |
| total of raw materials (part by weight) | | | 103.6 | 103.1 | 102.5 | 100 | 100.5 | 100.9 | 102.6 |
| component compositions of film (% by weight) | | | | | | | | | |
| (A) | (a1) | Eco Flex (aliphatic-aromatic) | 60.0 | 54.2 | 44.6 | 0 | 34.9 | 17.8 | 47.2 |
| | | Bionolle (aliphatic) | 0 | 0 | 0 | 12.5 | 0 | 0 | 0 |
| | | Total of (a-1) | 60.0 | 54.2 | 44.6 | 12.5 | 34.9 | 17.8 | 47.2 |
| | (a2) | Nature Works 4042D (polylactic acid) | 6.0 | 15.0 | 30.0 | 68.5 | 59.8 | 71.9 | 19.8 |
| | | total of (A) | 66.0 | 69.2 | 74.6 | 81.0 | 94.7 | 89.7 | 67.0 |
| (B) | | cornstarch (starch) | 31.8 | 28.7 | 23.6 | 0 | 4.9 | 9.5 | 25.0 |
| (C) | | Corn Pole CP-3 (modified starch) | 0 | 0 | 0 | 15.0 | 0 | 0 | 6.0 |

TABLE 3-continued

|  |  |  |  |  |  |  |  |  |
|---|---|---|---|---|---|---|---|---|
| (D) | glycerine | 2.2 | 2.1 | 1.8 | 0 | 0.4 | 0.8 | 2.0 |
|  | ATBC | 0 | 0 | 0 | 4.0 | 0 | 0 | 0 |
| total of (B) and (C) |  | 31.8 | 28.7 | 23.6 | 15.0 | 4.9 | 9.5 | 31.0 |
| total of (A), (B), (C) and (D) |  | 100 | 100 | 100 | 100 | 100 | 100 | 100 |
|  | (a1)/(A) (% by weight) | 91 | 78 | 60 | 15 | 37 | 20 | 70 |
|  | (aliphatic-aromatic)/(A) (% by weight) | 91 | 78 | 60 | 0 | 37 | 20 | 70 |
|  | (a2)/(A) (% by weight) | 9 | 22 | 40 | 85 | 63 | 80 | 30 |
| (F) | KMP-590 (silicone resin) | 0 | 0 | 0 | 0 | 0 | 0 | 0 |
| film physical properties |  |  |  |  |  |  |  |  |
| matting property | gloss (%) | 4 | 5 | 6 | 26 | 45 | 29 | 5 |
|  | matting property evaluation | aa | aa | aa | b | c | b | aa |
| film forming stability |  | aa | aa | aa | aa | aa | aa | aa |
| irregularities transfer property and adhesiveness |  | a | aa | aa | a | aa | a | aa |
| elongation | elongation at break (%) | 450 | 350 | 180 | 10 | 200 | 250 | 150 |
|  | elongation evaluation | aa | aa | aa | b | aa | aa | aa |
| antifouling characteristic | coffee | 4 class | 4 class | 4 class | 5 class | 5 class | 5 class | 4 class |
|  | crayon | 4 class | 4 class | 4 class | 4 class | 4 class | 4 class | 4 class |
|  | soy sauce | 4 class | 4 class | 5 class | 5 class | 5 class | 5 class | 4 class |
|  | paint-stick | 3 class | 4 class | 4 class | 5 class | 5 class | 5 class | 4 class |
|  | antifouling characteristic evaluation | c | b | a | aa | aa | aa | b |
| overall evaluation |  | C | B | A | B | C | B | B |

TABLE 4

|  |  | Comparative Examples |  |  |  |  |  |
|---|---|---|---|---|---|---|---|
|  |  | 1A | 2A | 3A | 4A | 5A | 6A |
| raw material compositions (part by weight) |  |  |  |  |  |  |  |
| Nature Works 4042D (polylactic acid) |  | 60 |  | 60 |  |  |  |
| Eco Flex (aliphatic-aromatic) |  | 40 |  |  |  |  |  |
| Bionolle (aliphatic) |  |  |  |  |  |  |  |
| starch/glycerine/Eco-MB1 |  |  | 48.7 |  |  |  | 103.9 |
| starch/glycerine/Eco-MB2 |  |  |  |  |  |  |  |
| modified starch/ATBC/PLA-MB1 |  |  |  |  |  |  |  |
| modified starch/ATBC/PLA-MB2 |  |  | 53 |  |  |  |  |
| modified starch/PLA-MB |  |  |  |  | 40 |  |  |
| silicone/PLA-MB |  |  |  |  |  |  |  |
| total of raw materials (part by weight) |  | 100 | 101.7 | 100 | 0 | 0 | 103.9 |
| component compositions of film (% by weight) |  |  |  |  |  |  |  |
| (A) (a1) | Eco Flex (aliphatic-aromatic) | 40.0 | 30.0 | 0 | 25.0 | 32.0 | 63.9 |
|  | Bionolle (aliphatic) | 0 | 0 | 0 | 0 | 0 | 0 |
|  | total of (a1) | 40.0 | 30.0 | 0 | 25.0 | 32.0 | 63.9 |
| (a2) | Nature Works 4042D (Polylactic acid) | 60.0 | 20.0 | 80.0 | 50.0 | 37.0 | 0 |
|  | total of (A) | 100 | 49.9 | 80.0 | 75.0 | 69.0 | 63.9 |
| (B) | cornstarch (Starch) | 0 | 15.9 | 0 | 15.0 | 0 | 33.9 |
| (C) | Corn Pole CP-3 (modified starch) | 0 | 25.0 | 20.0 | 10.0 | 15 | 0 |
| (D) | glycerine | 0 | 1.2 | 0 | 0 | 0 | 2.2 |
|  | ATBC | 0 | 8 | 0 | 0 | 16 | 0 |
| total of (B) and (C) |  | 0.0 | 40.9 | 20.0 | 25.0 | 15.0 | 33.9 |
| total of (A), (B), (C) and (D) |  | 100 | 100 | 100 | 100 | 100 | 100 |
| (a1)/(A) (% by weight) |  | 40 | 60 | 0 | 33 | 46 | 100 |
| (aliphatic-aromatic)/(A) (% by weight) |  | 40 | 60 | 0 | 33 | 46 | 100 |
| (a2)/(A) (% by weight) |  | 60 | 40 | 100 | 67 | 54 | 0 |
| (F) | silicone | 0 | 0 | 0 | 0 | 0 | 0 |
| film physical properties |  |  |  |  | film forming impossibility | blocking |  |
| matting property | gloss (%) | 70 | 4 | 21 |  |  | 4 |
|  | matting property evaluation | x | aa | b |  |  | aa |
| film forming stability |  | aa | x | a |  |  | aa |

TABLE 4-continued

|  |  | Comparative Examples | | | | | |
|---|---|---|---|---|---|---|---|
|  |  | 1A | 2A | 3A | 4A | 5A | 6A |
| irregularities transfer property and adhesiveness | | aa | x | c | | | aa |
| elongation | elongation at break (%) | 270 | 4 | 2 | | | 550 |
|  | elongation evaluation | aa | x | x | | | aa |
| antifouling characteristic | coffee | 5 class | 4 class | 5 class | | | 3 class |
|  | crayon | 4 class | 4 class | 4 class | | | 3 class |
|  | soy sauce | 5 class | 4 class | 5 class | | | 4 class |
|  | paint-stick | 5 class | 4 class | 5 class | | | 3 class |
|  | antifouling characteristic evaluation | aa | b | aa | | | x |
| overall evaluation | | x | x | x | x | x | x |

TABLE 5

|  | Examples | | | | | | | Comparative Example |
|---|---|---|---|---|---|---|---|---|
|  | 18A | 19A | 20A | 21A | 22A | 23A | 24A | 7A |
| raw materials used for first layer of multi-layer film (part by weight) | | | | | | | | |
| Nature Works 4042D (polylactic acid) | 35.4 | 42.4 | 35.4 | 25.4 | 39.3 | 23.4 | 30.9 | 42.4 |
| Mater-Bi NF01U | 53.8 | 35.2 | 44.5 | 54.8 | | 72.5 | | 35.2 |
| Bionolle (aliphatic) | | | | | | | 12.5 | |
| Eco Flex (aliphatic-aromatic) | | 3 | 5 | 5 | | | | 3 |
| modified starch/ATBC/PLA-MB1 | | | | | | | 50 | |
| starch/glycerine/Eco-MB2 | | | | | 56 | | | |
| modified starch/PLA-MB | | 14 | 10 | 10 | | | | 14 |
| talc/Eco-MB | 10 | | | | | | | |
| CDl/PLA-MB | 2 | 2 | 2 | 2 | 2 | 2 | 2 | 2 |
| antibacterial agent/PLA-MB | 5 | 5 | 5 | 5 | 5 | 5 | 5 | 5 |
| total of materials (part by weight) | 106.2 | 101.6 | 101.9 | 102.2 | 102.3 | 102.9 | 100.4 | 101.6 |
| component compositions of first layer of multi-layer film (% by weight) | | | | | | | | |
| (a1) Eco Flex | 6.0 | 3.0 | 5.0 | 5.0 | 29.9 | 0 | 0 | 3.0 |
| (a1) polybutylene terephthalate adipate | 33.1 | 21.6 | 27.4 | 33.7 | 0 | 44.6 | 0 | 21.6 |
| (a1) Bionolle | 0 | 0 | 0 | 0 | 0 | 0 | 12.5 | 0 |
| total of (a1) | 39.1 | 24.6 | 32.4 | 38.7 | 29.9 | 44.6 | 12.5 | 24.6 |
| (a2) Nature Works 4042D | 42.0 | 56.0 | 47.0 | 37.0 | 45.9 | 30.0 | 68.5 | 56.0 |
| total of (A) | 81.1 | 80.6 | 79.4 | 75.7 | 75.8 | 74.6 | 81.0 | 80.6 |
| (B) cornstarch (starch) | 17.5 | 11.4 | 14.5 | 17.8 | 22.7 | 23.6 | 0.0 | 11.4 |
| (c) Corn Pole CP-3 (modified starch) | 0 | 7 | 5 | 5 | 0 | 0 | 15 | 7 |
| (D) plasticizer (D) ATBC | 0 | 0 | 0 | 0 | 0 | 0 | 4 | 0 |
| plasticizer (D), glycerine | 1.4 | 1.0 | 1.1 | 1.5 | 1.5 | 1.8 | 0 | 1.0 |
| total of (B) and (C) | 17.5 | 18.4 | 19.5 | 22.8 | 22.7 | 23.6 | 15.0 | 18.4 |
| total of (A), (B), (C) and (D) | 100 | 100 | 100 | 100 | 100 | 100 | 100 | 100 |
| (E) High Filler #5000PJ (talc) (part by weight) | 4 | 0 | 0 | 0 | 0 | 0 | 0 | 0 |
| Carbozirite LA-1 (hydrolysis depressant) (part by weight) | 0.2 | 0.2 | 0.2 | 0.2 | 0.2 | 0.2 | 0.2 | 0.2 |
| Nobaron AG1100 (antibacterial agent) (part by weight) | 0.2 | 0.2 | 0.2 | 0.2 | 0.2 | 0.2 | 0.2 | 0.2 |
| (a1)/(A) (% by weight) | 48 | 31 | 41 | 51 | 39 | 60 | 15 | 31 |
| (aliphatic-aromatic) (A) (% by weight) | 48 | 31 | 41 | 51 | 39 | 60 | 0 | 31 |
| (a2)/(A) (% by weight) | 52 | 69 | 59 | 49 | 61 | 40 | 85 | 69 |
| component compositions of second layer of multi-layer film (% by weight) | | | | | | | | |
| Eco Flex | 75 | 75 | 80 | 70 | 75 | 75 | 70 | 75 |
| Nature Works 4042D | 25 | 25 | 20 | 30 | 25 | 25 | 30 | 25 |
| total | 100 | 100 | 100 | 100 | 100 | 100 | 100 | 100 |
| Carbozirite LA-1 (hydrolysis depressant) | 0.5 | 0.5 | 0.5 | 0.5 | 0.5 | 0.5 | 0.5 | 0.5 |
| component compositions of third layer of multi-layer film (% by weight) | | | | | | | | |
| Suntec LD F-1920 | 100 | 100 | 100 | 100 | 100 | 100 | 100 | none |
| thickness of each layer (μm) | | | | | | | | |
| first layer | 5 | 5 | 5 | 5 | 4 | 5 | 5 | 5 |
| second layer | 5 | 5 | 5 | 5 | 6 | 5 | 5 | 5 |
| third layer | 10 | 10 | 10 | 10 | 10 | 10 | 10 | 0 |
| total | 20 | 20 | 20 | 20 | 20 | 20 | 20 | 10 |

TABLE 5-continued

|  |  | Examples | | | | | | | Comparative Example |
|---|---|---|---|---|---|---|---|---|---|
|  |  | 18A | 19A | 20A | 21A | 22A | 23A | 24A | 7A |
|  | film physical properties | | | | | | | | |
| matting property | gloss (%) | 7 | 7 | 5 | 5 | 5 | 6 | 26 | 7 |
|  | matting property evaluation | aa | aa | aa | aa | aa | aa | b | aa |
| film forming stability |  | aa | aa | aa | aa | aa | aa | aa | x |
| irregularities transfer property and adhesiveness |  | aaa | aaa | aaa | aaa | aaa | aaa | aaa | aaa |
| elongation | elongation at break (%) | 170 | 140 | 140 | 130 | 100 | 180 | 10 | 140 |
|  | elongation evaluation | aa | aa | aa | aa | aa | aa | b | aa |
| antifouling characteristic | coffee | 5 class | 4 class | 5 class | 5 class | 5 class | 4 class | 5 class | 4 class |
|  | crayon | 4 class | 5 class | 4 class | 4 class | 4 class | 4 class | 4 class | 5 class |
|  | soy sauce | 5 class | 5 class | 5 class | 5 class | 5 class | 5 class | 5 class | 5 class |
|  | paint-stick | 5 class | 5 class | 5 class | 5 class | 5 class | 4 class | 5 class | 5 class |
|  | antifouling characteristic evaluation | aa | aa | aa | aa | aa | a | aa | aa |
| hydrolysis resistance |  | aa | aa | aa | aa | aa | aa | a | aa |
| overall evaluation |  | AAA | AAA | AAA | AAA | AAA | A | B | x |

TABLE 6

|  | weight average molecular weight | D body content | optical purity | Tg | Tm | note |
|---|---|---|---|---|---|---|
| biodegradable resin (A) | | | | | | |
| Lacty 9030 (crystalline polylactic acid) | 170,000 | 4.2% | 92% | 60° C. | 149° C. | product manufactured by Shimadzu Corporation |
| Bionolle #3001 (polybutylene succinate adipate) |  |  |  | −45° C. | 95° C. | product manufactured by Showa Highpolymer Co., Ltd. |
| Eco Flex (biodegradable aliphatic-aromatic polyester) |  |  |  | −30° C. | 110° C. | product manufactured by BASF |
| Lunarle SE-P5000 (polyethylene succinate) |  |  |  | −11° C. | 100° C. | product manufactured by Nippon Shokubai Co., Ltd. |
| non-adhesive resin | | | | | | |
| Suntec LD F-1920 (low density polyethylene) |  |  |  |  |  | product manufactured by Asahi Kasei Chemicals Corporation |

|  | mean particle diameter | whiteness degree | optical purity | Tg | Tm | note |
|---|---|---|---|---|---|---|
| inorganic filler (E) | | | | | | |
| colocalso EX (Calcium carbonate) | 7.0 μm | ≧94.5 |  |  |  | Product manufactured by Shiraishi Calcium Kaisya Ltd. |
| High Filler (talc) | 1.5 μm | >92.0 |  |  |  | product manufactured by Matsumura Sangyo |
| Siperunate FK310 (silica) | 2.0 μm | — |  |  |  | product manufactured by Degussa Japan |
| fine particle polymer (F) | | | | | | |
| KMP-590 (silicone resin) | 1.5 μm |  |  |  |  | product manufactured by Shin-Etsu Chemical Co., Ltd. |
| starch derivative (C) | | | | | | |
| Corn Pole CP-3 (esterified starch) |  |  |  | 120-137° C. |  | product manufactured by Nihon Cornstarch corporation |

TABLE 7

|  | Examples | | | | | | | | | |
|---|---|---|---|---|---|---|---|---|---|---|
|  | 1B | 2B | 3B | 4B | 5B | 6B | 7B | 8B | 9B | 10B |
| compositions (% by weight) | | | | | | | | | | |
| (A) Eco Flex (aliphatic-aromatic) | 40 | 69 | 40 | 45 | 85 | 88 | 57 | 54 | | |
| Bionolle | | | | | | | | | 62 | |
| Lunarle | | | | | | | | | | 70 |
| total of (a1) | 40 | 69 | 40 | 45 | 85 | 88 | 57 | 54 | 62 | 70 |
| (a2) lacty (PLA) | 35 | 20 | 40 | 28 | 10 | 10 | 10 | 8 | 10 | 10 |
| total of (A) | 75 | 89 | 80 | 73 | 95 | 98 | 67 | 62 | 72 | 80 |
| (E) talc | 15 | | 20 | 22 | | | | 38 | | |
| calcium carbonate | | 11 | | | | 2 | 33 | | | 20 |
| silica | | | | | 4 | | | | 20 | |
| (F) silicone resin | 10 | | | 5 | | | | | 8 | |
| total of (E) and (F) | 25 | 11 | 20 | 27 | 4 | 2 | 33 | 38 | 28 | 20 |
| total of (A), (E) and (F) | 100 | 100 | 100 | 100 | 99 | 100 | 100 | 100 | 100 | 100 |
| (a1)/(A) (% by weight) | 53 | 78 | 50 | 62 | 89 | 90 | 85 | 87 | 86 | 88 |
| (aliphatic-aromatic)/(A) (% by weight) | 53 | 78 | 50 | 62 | 89 | 90 | 85 | 87 | 0 | 0 |
| (a2)/(A) (% by weight) | 47 | 22 | 50 | 38 | 11 | 10 | 15 | 13 | 14 | 13 |
| film physical properties | | | | | | | | | | |
| gloss (%) | 5 | 9 | 6 | 5 | 25 | 33 | 4 | 4 | 6 | 8 |
| matting property evaluation | aa | aa | aa | aa | b | c | aa | aa | aa | aa |
| film forming stability | aa | aa | aa | aa | aa | aa | b | c | a | aa |
| irregularities transfer property and adhesiveness | aa | aa | aa | aa | aa | aa | b | c | a | a |
| film elongation | aa | aa | aa | aa | aa | aa | a | b | aa | aa |
| antifouling characteristic | | | | | | | | | | |
| coffee | 4 class | 4 class | 4 class | 4 class | 4 class | 4 class | 4 class | 4 class | 4 class | 4 class |
| crayon | 5 class | 4 class | 4 class | 4 class | 4 class | 4 class | 4 class | 4 class | 4 class | 4 class |
| soy sauce | 5 class | 4 class | 4 class | 5 class | 4 class | 4 class | 4 class | 4 class | 5 class | 4 class |
| paint-stick | 5 class | 4 class | 5 class | 5 class | 4 class | 4 class | 4 class | 4 class | 4 class | 4 class |
| antifouling characteristic evaluation | aa | b | aa | aa | b | b | b | b | a | b |
| hydrolysis resistance test | a | a | a | a | a | a | a | a | b | b |
| overall evaluation | AA | B | AA | AA | B | C | B | C | A | B |

|  | Examples | | | | | | Comparative Examples | | |
|---|---|---|---|---|---|---|---|---|---|
|  | 11B | 12B | 13B | 14B | 15B | 16B | 1B | 2B | 3B |
| compositions (% by weight) | | | | | | | | | |
| (A) Eco Flex (aliphatic-aromatic) | | 40 | 32 | 24 | 12 | 40 | 100 | 50 | |
| Bionolle | 20 | | | | | | | | |
| Lunarle | | | | | | | | | |
| total of (a1) | 20 | 40 | 32 | 24 | 12 | 40 | 100 | 50 | 0 |
| (a2) lacty (PLA) | 60 | 40 | 48 | 56 | 68 | 40 | 0 | 7 | 80 |
| total of (A) | 80 | 80 | 80 | 80 | 80 | 80 | 100 | 57 | 80 |
| (E) talc | 20 | 10 | 10 | 15 | 15 | | | 43 | 20 |
| calcium carbonate | | | | | | | | | |
| silica | | | | | | | | | |
| (F) silicone resin | | 10 | 10 | 5 | 5 | 20 | | | |
| total of (E) and (F) | 20 | 20 | 20 | 20 | 20 | 20 | 0 | 43 | 20 |
| total of (A), (E) and (F) | 100 | 100 | 100 | 100 | 100 | 100 | 100 | 100 | 100 |
| (a1)/(A) (% by weight) | 25 | 50 | 40 | 30 | 15 | 50 | 100 | 88 | 0 |
| (aliphatic-aromatic)/(A) (% by weight) | 0 | 50 | 40 | 30 | 15 | 50 | 100 | 88 | 0 |
| (a2)/(A) (% by weight) | 75 | 50 | 60 | 70 | 85 | 50 | 0 | 12 | 100 |
| film physical properties | | | | | | | | | |
| gloss (%) | 6 | 6 | 6 | 6 | 6 | 6 | 70 | 4 | 6 |
| matting property evaluation | aa | aa | aa | aa | aa | aa | x | aa | aa |
| film forming stability | aa | aa | aa | aa | aa | aa | aa | x | a |
| irregularities transfer property and adhesiveness | aa | aa | aa | aa | a | aa | aa | x | b |
| film elongation | aa | aa | aa | aa | b | aa | aa | c | x |
| antifouling characteristic | | | | | | | | | |
| coffee | 5 class | 4 class | 5 class | 5 class | 5 class | 5 class | — | — | — |
| crayon | 4 class | 5 class | 5 class | 5 class | 5 class | 5 class | — | — | — |
| soy sauce | 5 class | 5 class | 5 class | 5 class | 5 class | 5 class | — | — | — |

TABLE 7-continued

| | | | | | | | | | |
|---|---|---|---|---|---|---|---|---|---|
| paint-stick | 5 class | 5 class | 5 class | 5 class | 5 class | 5 class | — | — | — |
| antifouling characteristic evaluation | aa | aa | aa | aa | aa | aa | — | — | — |
| hydrolysis resistance test | b | a | a | b | b | a | — | — | — |
| overall evaluation | AA | AA | AA | AA | B | AA | x | x | x |

TABLE 8

| | | Examples | | | | | | | | Comparative Example |
|---|---|---|---|---|---|---|---|---|---|---|
| | | 17B | 18B | 19B | 20B | 21B | 22B | 23B | 24B | 4B |
| | compositions of the first layer (% by weight) | | | | | | | | | |
| (A) | Eco Flex (aliphatic-aromatic) | 40 | 36 | 50 | 67 | 43 | 34 | 24 | 17 | 50 |
| | total of (a1) | 40 | 36 | 50 | 67 | 43 | 34 | 24 | 17 | 50 |
| | (a2) Lacty (PLA) | 35 | 36 | 30 | 13 | 43 | 51 | 56 | 68 | 30 |
| | total of (A) | 75 | 72 | 80 | 80 | 86 | 85 | 80 | 85 | 80 |
| (E) | talc | 15 | 20 | 15 | | 10 | | 15 | 15 | 15 |
| (F) | silicone resin | 10 | 8 | 5 | 20 | 4 | 15 | 5 | | 5 |
| | total of (E) + (F) | 25 | 28 | 20 | 20 | 14 | 15 | 20 | 15 | 20 |
| | total of (A), (E) and (F) | 100 | 100 | 100 | 100 | 100 | 100 | 100 | 100 | 100 |
| (C) | esterified starch | | | | 10 | 10 | | | 5 | |
| carbodiimide | | 2 | 2 | | | 2 | 2 | 2 | 2 | |
| | (a1)/(A) (% by weight) | 53 | 50 | 63 | 84 | 50 | 40 | 30 | 20 | 63 |
| | (aliphatic-aromatic)/(A) (% by weight) | 53 | 50 | 63 | 84 | 50 | 40 | 30 | 20 | 63 |
| | (a2)/(A) (% by weight) | 47 | 50 | 38 | 16 | 50 | 60 | 70 | 80 | 38 |
| | composition of the second-layer (% by weight) | | | | | | | | | |
| | Eco Flex | 75 | 75 | 80 | 70 | 75 | 75 | 90 | 70 | 80 |
| | Lacty | 25 | 25 | 20 | 30 | 25 | 25 | 10 | 30 | 20 |
| | total | 100 | 100 | 100 | 100 | 100 | 100 | 100 | 100 | 100 |
| | carbodiimide | 0.5 | 0.5 | 0.5 | 0.5 | 0.5 | 0.5 | 0.5 | 0.5 | 0.5 |
| | composition of the third layer (% by weight) | | | | | | | | | |
| | Suntec LD F-1920 | 100 | 100 | 100 | 100 | 100 | 100 | 100 | 100 | none |
| | thickness of each layer (μm) | | | | | | | | | |
| | first layer | 5 | 4 | 6 | 5 | 4 | 5 | 5 | 5 | 6 |
| | second layer | 5 | 6 | 4 | 5 | 6 | 5 | 5 | 5 | 4 |
| | third layer | 10 | 15 | 5 | 10 | 10 | 10 | 10 | 10 | 0 |
| | total | 20 | 25 | 15 | 20 | 20 | 20 | 20 | 20 | 10 |
| | film physical properties | | | | | | | | | |
| | gloss (%) | 5 | 4 | 6 | 7 | 6 | 6 | 6 | 6 | 6 |
| | matting property evaluation | aa | aa | aa | aa | aa | aa | aa | aa | aa |
| | film forming stability | aa | aa | aa | aa | aa | aa | aa | aa | x |
| | irregularities transfer property and adhesiveness | aaa | aaa | aaa | aaa | aaa | aaa | aaa | aaa | aaa |
| | film elongation | aa | aa | aa | aa | aa | aa | aa | a | aa |
| | antifouling characteristic | | | | | | | | | |
| | coffee | 4 class | 4 class | 4 class | 4 class | 4 class | 5 class | 5 class | 5 class | — |
| | crayon | 5 class | 5 class | 4 class | 4 class | 5 class | 5 class | 5 class | 5 class | — |
| | soy sauce | 5 class | 5 class | 5 class | 5 class | 5 class | 5 class | 5 class | 5 class | — |
| | paint-stick | 5 class | 5 class | 5 class | 5 class | 5 class | 5 class | 5 class | 5 class | — |
| | antifouling characteristic evaluation | aa | aa | aa | aa | aa | aa | aa | aa | — |
| | hydrolysis resistance test | aa | aa | a | a | aa | aa | a | a | — |
| | overall evaluation | AAA | AAA | AAA | AAA | AAA | AAA | AAA | A | x |

INDUSTRIAL APPLICABILITY

Since the biodegradable resin as the main component in the matte film or sheet of the present invention having antifouling characteristic has biodegradability, the matte film or sheet is advantageous in view of natural environment protection also in discarding the matte film or sheet after use. Also, the matte film or sheet has good film forming stability and processing aptitude, and is independently used, or used with the matte film or sheet laminated on the other materials. The matte film or sheet is suitably used as the packaging material which has antifouling characteristic and luxury appearance due to matting property, and the agricultural material such as the growing house and the mulch film. Also, the matte film or sheet can be suitably used in the field of the lamination film or sheet laminated on the surfaces of the wallpaper, the screen, the indoor decoration, the article for everyday, the school supplies, the writing material, the notebook, the paper product and the paper container, the cloth product, the fiber product and the tablecloth or the like to apply luxury appearance due to matting property and moderate waterproof property and the dirt prevention function, and in the field of the lamination film or sheet laminated on the surface of the light diffusing plate to increase the optical diffusing function.

The invention claimed is:

1. A single-layer matte film or sheet comprising a biodegradable resin (A), a starch (B), and a plasticizer (D), wherein the single-layer matte film or sheet comprises:
   70 to 91.9% by weight of the biodegradable resin (A) based on the total weight of the biodegradable resin (A), starch (B) and plasticizer (D), the resin (A) comprising a blend which comprises 20 to 50% by weight of a biodegradable aliphatic-aromatic polyester (a1) having a glass transition temperature Tg of 10° C. or lower and 50 to 80% by weight of a biodegradable polylactic acid resin (a2) having a glass transition temperature Tg of 30° C. or higher and in which the total of the biodegradable polyesters (a1) and (a2) is 100% by weight;
   8 to 25% by weight of the starch (B) as the filler based on the total weight of the biodegradable resin (A), starch (B) and plasticizer (D); and
   0.1 to 5% by weight of the plasticizer (D) based on the total weight of the biodegradable resin (A), starch (B) and plasticizer (D);
   wherein at least one surface of the single-layer matte film or sheet has a surface gloss (Gloss: 45 degree) as measured in accordance with ASTM-D2457-70 of 60% or lower.

2. The single-layer matte film or sheet according to claim 1, further comprising 10 parts by weight or lower of an inorganic filler (E) and/or fine particle polymer (F) as the filler based on 100 parts by weight of the total of the biodegradable resin (A), starch (B), and plasticizer (D).

3. A multilayer matte film or sheet comprising the single-layer matte film or sheet according to claim 1, wherein the matte film or sheet is laminated so that a surface of the matte film or sheet having a surface gloss of 60% or lower is at least one outer surface of the multilayer matte film or sheet.

4. A multilayer matte film or sheet comprising at least two layers, wherein the layers comprises:
   the single-layer matte film or sheet according to claim 1 laminated so that a surface having a surface gloss of 60% or lower is one outer surface of the multilayer matte film or sheet; and
   a layer laminated on the other surface of the multilayer matte film or sheet and comprising a resin comprising 40% by weight or higher of the biodegradable polyester (a1) having a glass transition temperature Tg of 10° C. or lower.

5. The multilayer matte film or sheet according to claim 4, wherein the biodegradable polyester (a1) used on the other outer surface and having a glass transition temperature Tg of 10° C. or lower is an aliphatic-aromatic polyester.

6. A method for producing the matte film or sheet according to claim 1, comprising the steps of:
   selecting a resin non-adhesive to at least one surface of the matte film or sheet;
   bringing the surface of the matte film or sheet into contact with the non-adhesive resin layer to form a co-extruded film or sheet; and then
   removing the non-adhesive resin layer to provide the matte film or sheet.

7. A packaging material comprising the matte film or sheet according to claim 1.

8. An agricultural material comprising the matte film or sheet according to claim 1.

9. A wallpaper having a surface on which the matte film or sheet according to claim 1 is laminated.

10. An indoor decoration having a surface on which the matte film or sheet according to claim 1 is laminated.

11. An article for everyday, school supplies, writing material or a notebook having a surface on which the matte film or sheet according to claim 1 is laminated.

12. A paper product having a surface on which the matte film or sheet according to claim 1 is laminated.

13. A cloth product having a surface on which the matte film or sheet according to claim 1 is laminated.

14. A light diffusing plate having a surface on which the matte film or sheet according to claim 1 is laminated.

15. A screen having a surface on which the matte film or sheet according to claim 1 is laminated.

16. A single-layer matte film or sheet comprising a biodegradable resin (A), an inorganic filler (E), and a fine particle polymer (F), wherein the single-layer matte film or the sheet comprises:
   60 to 99% by weight of the biodegradable resin (A) based on the total weight of the biodegradable resin (A), inorganic filler (E) and fine particle polymer (F), the resin (A) comprising the blend which comprises 5 to 95% by weight of a biodegradable aliphatic-aromatic polyester (a1) having a glass transition temperature Tg of 10° C. or lower and 5 to 95% by weight of a biodegradable polylactic acid resin (a2) having a glass transition temperature Tg of 30° C. or higher, and in which the total of the biodegradable polyesters (a1) and (a2) is 40 to 100% by weight;
   1 to 40% by weight of the total of the inorganic filler (E) and/or the fine particle polymer (F) as the filler based on the total weight of the biodegradable resin (A), inorganic filler (E) and fine particle polymer (F);
   wherein at least one surface of the single-layer matte film or sheet has a surface gloss (Gloss: 45 degree) as measured in accordance with ASTM-D2457-70 of 60% or lower.

17. The single-layer matte film or sheet according to claim 16, wherein the inorganic filler (E) and/or the fine particle polymer (F) have/has a mean particle diameter of 10 μm or lower.

18. The single-layer matte film or sheet according to claim 16, further comprising 15% by weight or lower of a starch (B) based on the total weight of the biodegradable resin (A), and inorganic filler (E) and/or fine particle polymer (F).

19. A multilayer matte film or sheet comprising the single-layer matte film or sheet according to claim 16, laminated so that a surface having a surface gloss of 60% or lower is at least one outer surface.

20. A multilayer matte film or sheet comprising at least two layers, where two layers comprise:
   the single-layer matte film or sheet according to claim 16 laminated so that a surface having a surface gloss of 60% or lower is one outer surface; and
   a layer laminated on the other surface and containing a resin comprising 40% by weight or higher of the biodegradable polyester (a1) having a glass transition temperature Tg of 10° C. or lower.

21. The multilayer matte film or sheet according to claim 20, wherein the biodegradable polyester (a1) used on the other outer surface and having a glass transition temperature Tg of 10° C. or lower is an aliphatic-aromatic polyester.

* * * * *